US012131850B2

(12) United States Patent
Chen et al.

(10) Patent No.: US 12,131,850 B2
(45) Date of Patent: Oct. 29, 2024

(54) RARE EARTH MAGNET AND PREPARATION METHOD THEREOF

(71) Applicants: SANVAC (BEIJING) MAGNETICS CO., LTD., Beijing (CN); BEIJING ZHONG KE SAN HUAN HI-TECH CO., LTD., Beijing (CN)

(72) Inventors: Guoan Chen, Beijing (CN); Haojie Wang, Beijing (CN); Bin Fang, Beijing (CN); Fei Du, Beijing (CN); Zhan Wang, Beijing (CN); Yugang Zhao, Beijing (CN)

(73) Assignees: SANVAC (BEIJING) MAGNETICS CO., LTD., Beijing (CN); BEIJING ZHONG KE SAN HUAN HI-TECH CO., LTD., Beijing (CN)

( * ) Notice: Subject to any disclaimer, the term of this patent is extended or adjusted under 35 U.S.C. 154(b) by 686 days.

(21) Appl. No.: 17/357,073

(22) Filed: Jun. 24, 2021

(65) Prior Publication Data

US 2021/0335525 A1 Oct. 28, 2021

Related U.S. Application Data

(63) Continuation of application No. PCT/CN2018/125316, filed on Dec. 29, 2018.

(51) Int. Cl.
*H01F 1/057* (2006.01)
*C22C 33/02* (2006.01)
(Continued)

(52) U.S. Cl.
CPC ........... *H01F 1/0577* (2013.01); *C22C 33/02* (2013.01); *C22C 38/002* (2013.01);
(Continued)

(58) Field of Classification Search
CPC ..... H01F 1/0577; C22C 33/02; C22C 38/002; C22C 38/005; C22C 38/06; C22C 38/10; C22C 38/14; C22C 38/16; C22C 2202/02
See application file for complete search history.

(56) References Cited

U.S. PATENT DOCUMENTS 10,096,412 B2 10/2018 Kato et al.
2017/0018342 A1* 1/2017 Fukagawa ............... C22C 38/04
2017/0250015 A1 8/2017 Miwa et al.

FOREIGN PATENT DOCUMENTS

CN 101320609 A 12/2008
CN 103103442 A 5/2013
(Continued)

OTHER PUBLICATIONS

World Intellectual Property Organization (Wipo) International Search Report for PCT/CN2018/125316 Sep. 30, 2019 8 pages (including translation).

(Continued)

*Primary Examiner* — Brian D Walck
*Assistant Examiner* — Nazmun Nahar Shams
(74) *Attorney, Agent, or Firm* — ANOVA LAW GROUP, PLLC

(57) ABSTRACT

A NdFeB rare earth magnet includes a main phase and a grain boundary phase including a white grain boundary phase and a gray grain boundary phase. In a microstructure observation area of the rare earth magnet, an area of the white grain accounts for 1~3% of a total area of the microstructure observation area, and an area of the gray grain boundary phase accounts for 2~10% of the total area of the microstructure observation area.

9 Claims, 9 Drawing Sheets

(51) Int. Cl.

| | |
|---|---|
| ***C22C 38/00*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |
| ***H01F 41/02*** | (2006.01) |

(52) U.S. Cl.

CPC ............ *C22C 38/005* (2013.01); *C22C 38/06* (2013.01); *C22C 38/10* (2013.01); *C22C 38/14* (2013.01); *C22C 38/16* (2013.01); *H01F 41/0266* (2013.01); *C22C 2202/02* (2013.01)

(56) References Cited

FOREIGN PATENT DOCUMENTS

| | | | |
|---|---|---|---|
| CN | 103903824 | A | 7/2014 |
| CN | 104505206 | A | 4/2015 |
| CN | 104715876 | A | 6/2015 |
| CN | 104733146 | A | 6/2015 |
| CN | 105448466 | A | 3/2016 |
| CN | 106601407 | A | 4/2017 |
| CN | 106710765 | A | 5/2017 |
| CN | 107408437 | A | 11/2017 |
| CN | 107658087 | A | 2/2018 |
| CN | 107958760 | A | 4/2018 |
| JP | 2002038245 | A | 2/2002 |
| JP | 2014132628 | A | 7/2014 |
| JP | 2016184720 | A | 10/2016 |
| JP | 2017017121 | A | 1/2017 |
| JP | 2017183318 | A | 10/2017 |
| WO | 2018180891 | A1 | 10/2018 |

OTHER PUBLICATIONS

Japan Patent Office The Notice of Reasons for Refusal for Application No. 2021534243 Jan. 11, 2022 8 pages (with translation).

China National Intellectual Property Administration The First Office Action for Application No. 201880005046.9 Jun. 4, 2020 9 pages (with translation).

China National Intellectual Property Administration The First Search Report for Application No. 201880005046.9 May 27, 2020 2 pages.

China National Intellectual Property Administration The Second Office Action for Application No. 201880005046.9 Apr. 2, 2021 7 pages (with translation).

China National Intellectual Property Administration The Supplementary Search for Application No. 201880005046.9 Mar. 24, 2021 4 pages (with translation).

Qingwei Ying, "Manufacture and Properties of Sintered Permanent Magnetic Nd—Fe—B", China Master's These Full-text Database Engineering Science and Technology Series, Aug. 15, 2009, p. 1-17.

Haojie Wang et al., "Comparison Study of Nd2Fe14B/ α-Fe and Pr2Fe14B/ α-Fe Nanocrystalline Permanent Magnetic Alloys in Producing Process and Magnetic Properties", Chinese Rare Earths, Dec. 25, 2003, vol. 24, No. 6, pp. 52-55.

China National Intellectual Property Administration The Supplementary Search for Application No. 201880005046.9 May 24, 2021 1 pages.

* cited by examiner

RARE EARTH MAGNET AND PREPARATION METHOD THEREOF

CROSS-REFERENCE TO RELATED APPLICATION

This Application is a continuation of International Application No. PCT/CN2018/125316, filed Dec. 29, 2018, the entire content of which is incorporated herein by reference.

TECHNICAL FIELD

The disclosure is in the field of rare earth magnets, and particularly relates to a rare earth magnet and its preparation method.

BACKGROUND TECHNOLOGY

Sintered NdFeB magnet is the permanent magnet with the highest energy density discovered by mankind so far, and it has realized large-scale commercial production. Sintered NdFeB magnets have been widely used in computer hard disks, hybrid vehicles, medical treatment, wind power generation and many other fields. Its application field and output are increasing year by year. In particular, in the field of new energy vehicles, the NdFeB magnet needs to work in a certain high temperature environment and the permanent magnet needs to be lightweight. Thus, the magnet needs to have not only high remanence but also high coercivity.

In Chinese patent publication CN103887028, in order to obtain a magnet with a relatively high sum of magnetic energy product and intrinsic coercivity, Dy and Tb are used to partially replace Nd to increase the coercivity. However, the reserves of heavy rare earth Dy and Tb are scarce and they are expensive. They will also reduce the remanence. In addition, because Dy and Tb are vulnerable to the impact of rare earth policies, their prices are unstable, resulting in significant cost fluctuations.

In Chinese patent publication CN105190793, the technique is to reduce the content of B in the raw material, while add one or more metal elements of Ga, Al, and Cu. The one or more metal elements of Ga, Al, and Cu added during the tempering treatment react with $Nd_2Fe_{17}$ phase (2:17 phase) generated by rare earth and transition metals such as Fe, forming the $Nd_6Fe_{13}Ga$ phase (6:13:1 phase). A high-performance magnet having a high remanence and a high coercivity is obtained when the amount of Dy used is reduced. However, in the mass production using the above solution, if the $Nd_6Fe_{13}Ga$ phase cannot be sufficiently generated, the $Nd_2Fe_{17}$ phase will be present in the magnet, resulting in low coercivity, which makes the intrinsic coercivity deviation of magnets of the same batch become larger. Moreover, when the heavy rare earth Dy and Tb are diffused in the low B content magnets, the increase of the coercivity is relatively small and the demagnetization curve squareness after diffusion is poor.

SUMMARY

In order to solve the above problems, the present disclosure proposes a rare earth magnet and its preparation method. The dual-alloy method is used to prepare rare earth magnets. Through the control of the contents of Ga and B elements in the main and auxiliary alloys, the coercivity of the magnet is improved, and the use of heavy rare earth elements such as Dy and Tb is reduced. At the same time, in the mass production, the consistency of the performance of the magnet is ensured, and high-performance magnets with high remanence and high coercivity can be prepared.

The present disclosure provides a method for the preparation of a rare earth magnet comprising the following steps:

A. Mixing the main alloy powder and the auxiliary alloy powder in the mass ratio of 95~99:1~5 to obtain the mixed alloy powder. The mass ratio of each element of the main alloy is: $R_{28\sim32}M_{0.1\sim1.4}Ga_{0.3\sim0.8}B_{0.97\sim1.0}(DyTb)_{0\sim2}T_{bal}$, the mass ratio of each element of the auxiliary alloy is: $R_{31\sim35}M_{0\sim1.4}Ga_{0.5\sim0.8}B_{0.82\sim0.92}(DyTb)_{0\sim2}T_{bal}$, where R is a rare earth element that does not include Dy and Tb, and the proportion of Pr and/or Nd in R is 98~100 wt %, M is at least one element of Al, Cu, Nb, Zr, or Sn, and T is Fe and/or Co and inevitable impurity elements;

B. Orienting and pressing the mixed alloy powder under a magnetic field to form a compact;

C. Placing the compact in a vacuum sintering furnace for sintering, so as to obtain sintered magnets;

D. Tempering the sintered magnet to obtain the rare earth magnet.

In the above-mentioned preparation method of the rare earth magnet, M is Al and Cu, the content of Al in the rare earth magnet is 0.05~1 wt %, and the content of Cu is 0.05~0.3 wt %.

The above-mentioned preparation method of the rare earth magnet further includes, before step A: preparing the main alloy raw material and the auxiliary alloy raw material according to the mass ratio of each element; subjecting the main alloy raw material and the auxiliary alloy raw material to rapid quenching to obtain the main alloy flakes and the auxiliary alloy flakes, respectively; and subjecting the main alloy flakes and the auxiliary alloy flakes to hydrogen decrepitation pulverizing and jet mill grinding to obtain the main alloy powder and the auxiliary alloy powder, respectively.

The tempering treatment of step D in the above-mentioned preparation method of the rare earth magnet includes: primary tempering treatment: heat preservation at a temperature of 800° C.~950° C. for 2~6 hours; and secondary tempering treatment: heat preservation at a temperature of 470° C.~520° C. for 2~8 h.

The present disclosure also provides a process for producing a rare earth sputtering magnet characterized by comprising the steps of:

E. Machining the above-mentioned sintered magnets or rare earth magnets to obtain a substrate;

F. Performing sputtering on the substrate. First, the first target material is sputtered to form a first plating layer on the surface of substrate, then the second target material is sputtered to form a second plating layer on the outer surface of the first plating layer to obtain a rare earth sputtering magnet. The first plating layer is Nd plating layer or a Pr plating layer, or an alloy plating layer of at least two of Nd, Pr, and Cu, and the second plating layer is a Tb plating layer.

In step F of the method for preparing the rare earth sputtering magnet, the thickness of the first plating layer sputtered on the substrate is 1~2 μm and the thickness of the second plating layer sputtered is 2~12 μm.

In step F of the method for preparing the rare earth sputtering magnet, sputtering is performed on the surface of the substrate that is perpendicular to the orientation direction.

Step F of the above method of producing a rare earth sputtering magnet further comprises sputtering a third target material after sputtering the second target material to form a third plating layer on the outer surface of the second plating layer. The third plating layer is a Dy plating layer.

In the above-mentioned preparation method of the rare earth sputtering magnet, the first plating layer has a thickness of 1~2 μm, the second plating layer has a thickness of 2~10 μm, and the third plating layer has a thickness of 1~2 μm.

The disclosure also provides a method for preparing a rare earth sintered magnet, comprising the steps of:

G. Performing grain boundary diffusion treatment on the rare earth sputtering magnet to obtain a rare earth diffusion magnet.

In the above-mentioned preparation method of the rare earth diffusion magnet, the grain boundary diffusion treatment includes: primary diffusion treatment: heat preservation at a temperature of 750° C.~1000° C. for 1 h~10 h; secondary diffusion treatment: heat preservation at a temperature of 450° C.~520° C. for 1 h~10 h.

The present disclosure also provides a rare-earth magnet prepared by the above-mentioned preparation method of the rare-earth magnet, and its components include, by mass percentage: the content of R is 28~32 wt %, R is a rare earth element that does not include Dy and Tb and the proportion of Pr and/or Nd in R is 98~100 wt %; the content of Dy and/or Tb is 0~2 wt %; the content of M is 0.1~1.4 wt %, and M is at least one of Al, Cu, Nb, Zr, or Sn; the content of Ga is 0.3~0.8 wt %; the content of B is 0.96~1.0 wt %; the rest is T, and T is Fe and/or Co and inevitable impurity elements.

In the above rare earth magnet, the content of Ga is 0.5~0.8 wt %.

In the above-mentioned rare earth magnet, M is Al and Cu, the content of Al in the rare earth magnet is 0.05~1 wt %, and the content of Cu is 0.05~0.3 wt %.

The present disclosure also provides a rare earth sputtering magnet, prepared by the above-mentioned method for preparing rare earth sputtering magnets, and including a composite plating layer on the surface of the substrate to obtain a rare earth sputtering magnet; the plating layer includes a first plating layer and a second plating layer. The first plating layer is deposited on the surface of the substrate, and the first plating layer is a Nd plating layer, or a Pr plating layer, or at least two or more alloy plating layers among Nd, Pr, and Cu; the second plating layer is located on the outer surface of the first plating layer, and the second plating layer is a Tb plating layer.

In the above-mentioned rare earth sputtering magnet, the thickness of the first plating layer is 1~2 μm, and the thickness of the second plating layer is 2~12 μm.

In the above-mentioned rare earth sputtering magnet, the composite plating layer further includes a third plating layer, which is a Dy plating layer, and the third plating layer is located on the outer surface of the second plating layer.

In the above-mentioned rare earth sputtering magnet, the thickness of the first plating layer is 1~2 μm, the thickness of the second plating layer is 2~10 μm, and the thickness of the third plating layer is 1~2 μm.

The present disclosure also provides a rare earth diffusion magnet, which is obtained by performing thermal diffusion treatment on the rare earth sputtering magnet.

In some embodiments, the sum of the maximum magnetic energy product $(BH)_{max}$ and the intrinsic coercivity Hcj of the rare earth diffusion magnet is greater than 75, wherein the unit of the maximum magnetic energy product $(BH)_{max}$ is MGOe, and the unit of the intrinsic coercivity Hcj is kOe.

In the grain boundary phase of the rare earth magnet, the white grain boundary phase area accounts for 1~3% of the total area of the selected microstructure observation area, and the gray grain boundary phase area accounts for 2~10% of the total area of the selected microstructure observation area.

In the grain boundary phase of the rare earth diffusion magnet whose sum of the maximum magnetic energy product $(BH)_{max}$ and the intrinsic coercivity Hcj is greater than 75, the white grain boundary phase area accounts for 1~3% of the total area of the selected microstructure observation area, and the gray grain boundary phase area accounts for 2~4% of the total area of the selected microstructure observation area.

The present disclosure also provides a rare earth permanent magnet motor, which has a stator and a rotor, wherein the stator or the rotor is prepared by using the above-mentioned rare earth magnets.

In the rare-earth magnet, and its preparation method of the present disclosure, a dual-alloy process is adopted to prepare rare-earth magnets, and the rare-earth magnet's coercivity is improved and the use of heavy rare earth elements such as Dy and Tb is reduced, by controlling the contents of rare-earth elements and Ga and B elements in the main and auxiliary alloys. At the same time, in mass production, it ensures that the magnet has good performance consistency and good squareness of demagnetization curve, and high-performance magnets with high remanence and high coercivity can be prepared. After multiple rare earth targets are sputtered on the surface of rare earth magnets to form a new composite plating layer, and after thermal diffusion treatment, the coercivity is greatly improved with a relatively small reduction of remanence, and ultra-high performance magnets can be obtained.

The rotor or stator of the rare-earth permanent magnet motor of the present disclosure uses the above-mentioned rare-earth magnets or rare-earth diffusion magnets, which can realize a high-performance motor.

DETAILED DESCRIPTION OF THE EMBODIMENTS

Figure 1:
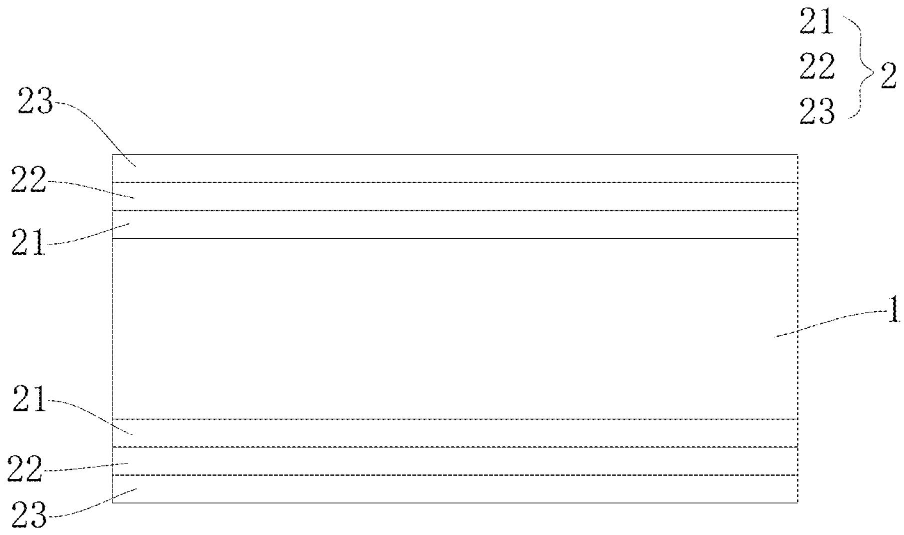
FIG. 1 is a schematic view of a rare earth magnet in the examples of the present disclosure.

The embodiments of the present disclosure will be described in more detail in conjunction with the accompanying drawings and examples in order to provide a better understanding of the embodiments of the disclosure and its advantages. However, the specific embodiments and examples described below are illustrative only rather than limiting the disclosure.

The word "connection" mentioned in the present disclosure, unless otherwise clearly specified or limited, should be understood in a broad sense, and it may be directly connected or connected through an intermediary. In the description of the present disclosure, it should be understood that the directional or positional relationship indicated by "up," "down," "front," "rear," "left," "right," "top," "bottom," etc. is based on the orientation or positional relationship shown in the drawings, which is only for the convenience of describing the present disclosure and simplifying the description, rather than indicating or implying that the device or element referred to must have a specific orientation or be constructed and operated in a specific orientation, therefore it should not be understood as a limitation to the present disclosure.

The embodiments of the present disclosure provide a rare earth magnet, and the composition of the rare earth magnet includes R, M, T, Ga, and B. The mass percentage of each component is: R content is 28~32 wt % and R is a rare earth element that does not include Dy and Tb; Pr and/or Nd accounts for 98~100 wt % in R; Dy and/or Tb content is 0~2 wt %; M content is 0.1~1.4 wt % and M is at least one of Al, Cu, Nb, Zr, or Sn; Ga content is 0.3~0.8 wt %, and in some embodiments, Ga content is 0.5~0.8 wt %; B content is 0.96~1.0 wt %; the rest is T, T is Fe and/or Co and inevitable impurity elements. In the above rare earth magnet, M is Al and Cu, the content of Al in the rare earth magnet is 0.05~1 wt %, and the content of Cu is 0.05~0.3 wt %.

The production of rare earth magnet of this embodiment adopts a dual-alloy method. By adjusting the compositions of the main and auxiliary alloys, the mass-produced magnets have high intrinsic coercivity consistency and good squareness of the demagnetization curve, which are suitable for mass production.

As shown in FIG. 1, an embodiment of the present disclosure provides a rare earth sputtering magnet, namely a rare earth magnet having a composite plating layer formed on its surface by sputtering. The rare earth magnet is used as a substrate 1 for physical deposition, and a composite plating layer 2 is formed on the surface of the substrate 1 to obtain a rare earth sputtering magnet. The composite plating layer 2 includes a first plating layer 21 and a second plating layer 22. The first plating layer 21 is deposited on the surface of the substrate 1. The first plating layer is a Nd plating layer, or a Pr plating layer, or an alloy plating layer of at least two or more of Nd, Pr, and Cu. The second plating layer 22 is located on the outer surface of the first plating layer 21, and the second plating layer 22 is a Tb plating layer.

The composite plating layer 2 may exist on one surface of the substrate 1 alone, or may be provided on two symmetrical surfaces of the substrate 1. When physical deposition is performed on the substrate 1, physical deposition may be performed on one surface of the substrate 1 first, and the substrate is turned over and physical deposition is then performed on the other surface. The physical deposition method used in this embodiment is magnetron sputtering, and other physical deposition methods can also be used.

Consistent with the disclosure, physical deposition can be performed on only one surface of the substrate or on two opposite surfaces of the substrate. As shown in FIG. 1, a composite plating layer is deposited on each of the upper and lower surfaces of the substrate. In this embodiment, the thickness of the plating layer refers to the thickness of a single layer. In the above rare earth magnet, the thickness of the first plating layer is 1~2 μm, and the thickness of the second plating layer is 2~12 μm.

Optionally, the composite plating layer further includes a third plating layer 23, the third plating layer 23 is a Dy plating layer, and the third plating layer 23 is located on the outer surface of the second plating layer 22. In some embodiments, the thickness of the first plating layer is 1~2 μm, the thickness of the second plating layer is 2~10 μm, and the thickness of the third plating layer is 1~2 μm.

The embodiments of the present disclosure also provide a rare earth diffusion magnet, namely a rare earth magnet obtained by thermal diffusion treatment of a rare earth sputtering magnet. That is, thermal diffusion treatment can be performed on the above rare earth sputtering magnet to obtain the rare earth diffusion magnet. In some embodiments, the sum of the maximum magnetic energy product $(BH)_{max}$ and the intrinsic coercivity Hcj of the rare earth diffusion magnet is greater than 75, wherein the unit of the maximum magnetic energy product $(BH)_{max}$ is MGOe, and the unit of intrinsic coercivity Hcj is kOe.

In the present disclosure, the rare earth magnet or sintered magnet prepared by the dual-alloy method is used as the substrate, the composite plating layer is obtained through sputtering, and then the thermal diffusion treatment is performed to obtain the ultra-high performance rare earth diffusion magnet; in some embodiments, the sum of the maximum magnetic energy product $(BH)_{max}$ and the intrinsic coercivity Hcj is greater than 75. Moreover, it is suitable for mass production, and the performance consistency between rare earth diffusion magnets is good.

Observation of microstructure through backscattered electron (BSE) image of the cross section perpendicular to the orientation direction of the tempered rare earth magnet reveals that the grain boundary phase in the triangle area between the main phase boundaries in the microstructure image shows two colors of white and gray. The grain boundary phases corresponding to the two colors are defined as white grain boundary phase and gray grain boundary phase. The triangular area is a region formed between three or more main phase crystal grains. When the magnification is 4000-8000 times, in any specific microscopic observation area, the white grain boundary phase area accounts for 1~3% of the total area of the selected microstructure observation area, and the gray grain boundary phase area accounts for 2~10% the selected microstructure observation area. For simplicity, hereinafter, the white grain boundary phase area ratio and the gray grain boundary phase area ratio are used to represent the percentage of area of the white grain boundary phase in the total area of the selected microstructure observation area and the percentage of the area of the gray grain boundary phase in the selected microstructure observation area, respectively. The gray grain boundary phase is $Nd_6Fe_{13}Ga$ phase, that is, 6:13:1 phase; the white grain boundary phase is the region with high rare earth content, and the composition is $R^1$~T~M phase, the atomic percentage of rare earth element $R^1$ is greater than 30 at % and the content of T and M elements varies greatly. $R^1$ is a rare earth element which must contain Nd and/or Pr, T is Fe and/or Co and unavoidable impurity elements, and M is at least one of Al, Cu, Nb, Zr, or Sn.

Both the white grain boundary phase and the gray grain boundary phase are mainly concentrated in the triangular grain boundary area, and their existence can isolate the main phase grains and increase the Hcj. The gray grain boundary phase is 6:13:1 phase, which is a metastable phase. After sintering, the 2:17 ($Nd_2Fe_{17}$) phase in the magnet is transformed into a 6:13:1 phase during the low temperature tempering process below 520° C. The degree of conversion is easily affected by the magnet tempering process. If the 6:13:1 phase cannot be sufficiently generated, the 2:17 phase will still exist in the magnet after the tempering treatment. The presence of the 2:17 phase will reduce the Hcj and the squareness of the demagnetization curve. The white grain boundary phase is a stable phase, which is relatively easy to form during the tempering process, and can partially replace the gray grain boundary phase to improve the Hcj. The white grain boundary phase area ratio and the gray grain boundary phase area ratio need to be controlled within an appropriate range. If they are too high, the area percentage of the main phase crystal grains in the magnet will decrease, and the magnet's remanence will decrease. If they are too low, it will be harmful to the improvement of Hcj.

For rare earth diffusion magnets, if the sintered magnet used as a sputtering substrate has not undergone a low-temperature tempering heat treatment process below 520° C., a transition reaction of 2:17 phase turning into 13:1 phase will occur during the secondary diffusion treatment of the diffusion heat treatment at 450° C.~520° C.

In the grain boundary phase of the rare earth diffusion magnet with the sum of the maximum magnetic energy product $(BH)_{max}$ and the intrinsic coercivity Hcj greater than 75, the white grain boundary phase accounts for 1~3% of the total area of the selected microstructure observation area and the gray grain boundary phase area accounts for 2~4% of the total area of the selected microstructure observation area.

The above-mentioned rare earth magnets and rare earth diffusion magnets can be used to prepare the stator or rotor of a rare earth permanent magnet motor.

Example 1

The steps of preparation of sintered magnets are as follows:

1. Prepare the main alloy raw materials and auxiliary alloy raw materials according to the mass ratio of each element. The mass ratio of each element of the main alloy raw material is $(PrNd)_{31.5}Al_{0.8}Co_{1.0}Cu_{0.1}Ga_{0.51}B_{0.98}Nb_{0.25}Zr_{0.08}Fe_{bal}$. The mass ratio of each element of auxiliary alloy raw material is $(PrNd)_{33}Al_{0.2}Co_{1.0}Cu_{0.1}Ga_{0.51}B_{0.86}Fe_{bal}$. "bal" means balance amount, i.e., the amount of a component in the alloy that together with other components makes up a total of 100 wt %.

2. Melt the main alloy raw materials and the auxiliary alloy raw materials in a strip casting furnace with a 600 kg capacity, and cast the scales at a roller speed of 1.5 m/s, and finally obtain the main alloy flakes and auxiliary alloy flakes with an average thickness of 0.2 mm.

3. Subject the main alloy flakes and the auxiliary alloy flakes to hydrogen decrepitation pulverizing, specifically, dehydrogenation is performed at 540° C. for 6 hours after saturated hydrogen absorption, and the hydrogen content after dehydrogenation is 1200 ppm, to obtain medium-pulverized powders of the main alloy and the auxiliary alloy. The medium pulverized powders of the main alloy and the auxiliary alloy are put into the jet mill to obtain the main alloy powder and the auxiliary alloy powder, respectively, with D50=3.8 μm, where D50 refers to the medium diameter of the powder.

4. Mix the main alloy powder and the auxiliary alloy powder according to the mass ratio of 97:3 to obtain mixed alloy powder.

5. Orient and compress the mixed alloy powder under the magnetic field of an automatic press to form a compact. The orientation magnetic field is 1.8 T and the initial compaction density of the compact is 4.5 g/cm$^3$.

6. Put the compact into a vacuum sintering furnace for sintering at temperature of 980° C. for 8 h to obtain a sintered magnet. After sintering, the magnet density is 7.51 g/cm$^3$.

The rare earth magnet is prepared by tempering the sintered magnet; the tempering treatment includes primary tempering with heat preservation at 920° C. for 2 h and secondary tempering with heat preservation at 480° C. for 6 h.

Ten samples of the same batch of rare earth magnets of this embodiment were randomly selected for performance testing. The test results are shown in Table 1 below.

TABLE 1

| Br(kGs) | Hcj(kOe) | Hk/Hcj | $(BH)_{max}$(MGOe) |
|---|---|---|---|
| 12.94~12.97 | 20~20.58 | 0.96~0.97 | 41.02~41.76 |

In Table 1: Br is the remanence, Hcj is the intrinsic coercivity, Hk/Hcj is the squareness of the demagnetization curve, and $(BH)_{max}$ is the maximum magnetic energy product.

The magnetic properties of 30 batches of rare earth magnets were tested and the results were analyzed as follows:

Set the quality condition Br as 13.0±0.1, Hcj as 20.0±1 kOe, and the calculated results are the CPK of Br is 1.67 and the CPK of Hcj is 1.87. CPK is complex process capability index. The higher the CPK value, the more stable the production control of the process, and the more stable the performance of mass-produced product.

Figure 2:
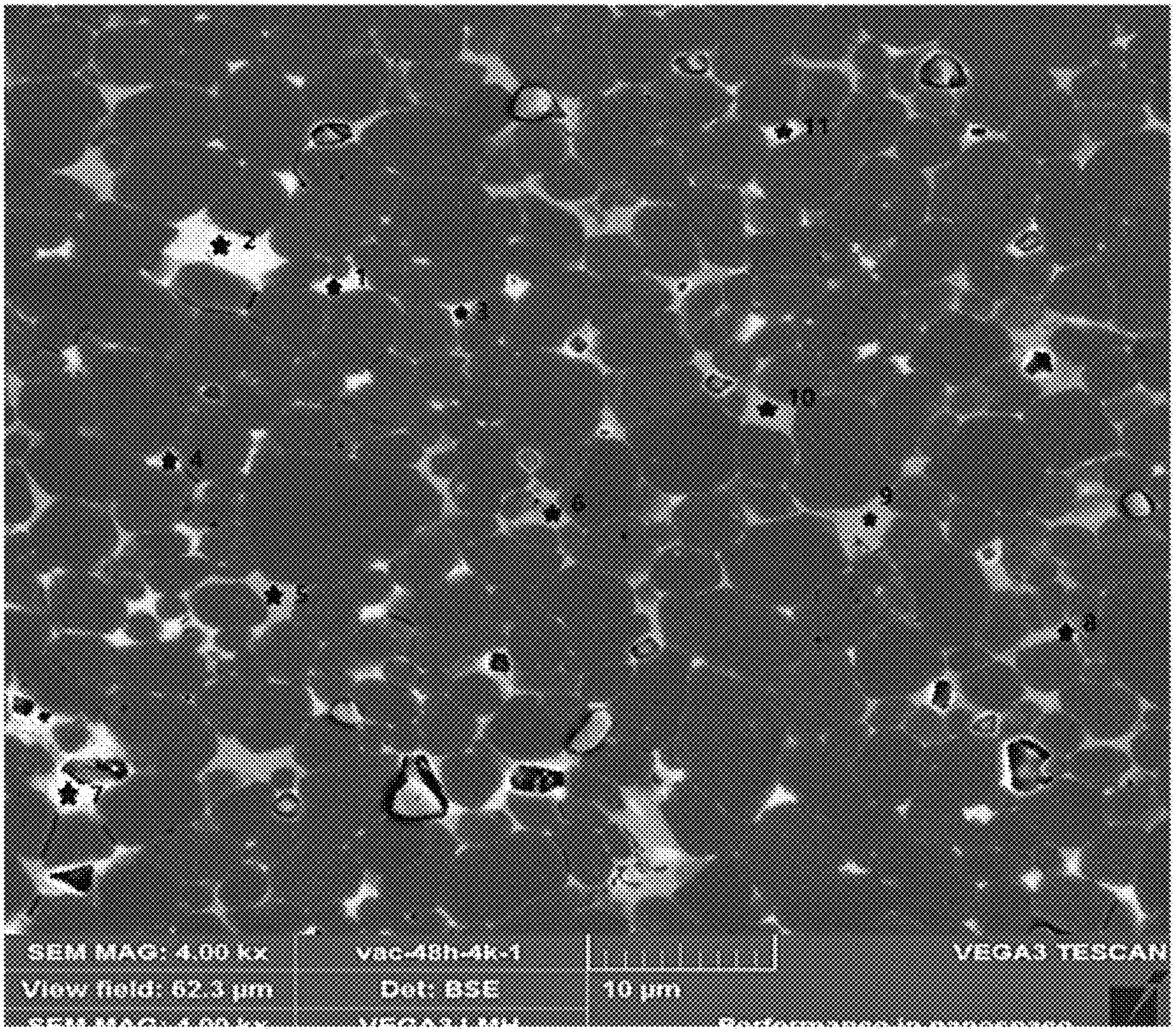
FIG. 2 is a 4000 times BSE electron image of the rare earth magnet of Example 1 of the present disclosure taken along a cross section perpendicular to the orientation direction through scanning electron microscope energy dispersive X-ray spectroscopy (EDS) analysis.

The cross section of the rare earth magnet perpendicular to the orientation direction was observed by scanning electron microscope to obtain the backscattered electron (BSE) image. The triangular grain boundary phase of the magnet has gray grain boundary phase and white grain boundary phase. Under 4000 times magnification, the gray grain boundary phase and white grain boundary phase at different positions in FIG. 2 were analyzed by EDS energy spectrum, and the content of each element in the grain boundary phase was obtained as shown in Table 2 below.

TABLE 2

| Element | 1 atom % | 2 atom % | 3 atom % | 4 atom % | 5 atom % | 6 atom % | 7 atom % | 8 atom % | 9 atom % | 10 atom % | 11 atom % |
|---|---|---|---|---|---|---|---|---|---|---|---|
| O | 6.38 | 7.68 | 5.05 | 8.13 | 8.13 | 8.1 | 8.07 | 5.96 | 6.52 | 6.12 | 7.25 |
| Al | 0.92 | 0.77 | 1.53 | 1.46 | 1.46 | 2.35 | 1.59 | 3.07 | 2.82 | 2.82 | 1.36 |
| Fe | 33.67 | 11.54 | 22.11 | 35.29 | 59.95 | 59.95 | 25.17 | 60.67 | 57.31 | 57.42 | 42.3 |
| Co | 0.7 | 3.83 | 1.72 | 2.61 | 1.17 | 1.17 | 3.67 | 1.32 | 1.35 | 1.18 | 0.43 |
| Cu | 0.67 | 7.72 | 3.6 | 5.05 | 0.17 | 0.17 | 4.73 | 0.24 | 0.33 | 0.1 | 0.13 |
| Ga | 0.39 | 11.53 | 5.25 | 6.71 | 3.47 | 3.47 | 10 | 3.56 | 4.54 | 4.49 | 0.22 |
| Zr | | | 0.12 | 0.11 | 0.12 | 0.12 | 0.29 | | 0.04 | | 0.08 |
| Pr | 20.1 | 17.5 | 19.96 | 12.63 | 6.9 | 6.9 | 14.3 | 7.4 | 8.13 | 8.28 | 16.88 |
| Nd | 37.18 | 39.43 | 45.34 | 28.01 | 16.98 | 16.98 | 32.18 | 17.78 | 18.98 | 19.59 | 31.34 |
| Total | 100 | 100 | 100 | 100 | 100 | 100 | 100 | 100 | 100 | 100 | 100 |
| $R^1$ | 57.28 | 56.93 | 65.3 | 40.64 | 23.88 | 23.88 | 46.48 | 25.18 | 27.11 | 27.87 | 48.22 |
| T | 34.37 | 15.37 | 23.83 | 37.9 | 61.12 | 61.12 | 28.84 | 61.99 | 58.66 | 58.6 | 42.73 |
| M | 1.98 | 20.02 | 10.5 | 13.33 | 5.22 | 6.11 | 16.61 | 6.87 | 7.73 | 7.41 | 1.79 |
| $R^1$ + T + M | 93.63 | 92.32 | 99.63 | 91.87 | 90.22 | 91.11 | 91.93 | 94.04 | 93.5 | 93.88 | 92.74 |
| $R^1$ % | 61% | 61.7% | 65.5% | 44.2% | 26.5% | 26.2% | 50.6% | 26.8% | 29.0% | 29.7% | 52.0% |
| T % | 36.7% | 16.6% | 23.9% | 41.3% | 67.7% | 67.1% | 31.4% | 65.9% | 62.7% | 62.4% | 46.1% |
| M % | 2.1% | 21.7% | 10.5% | 14.5% | 5.8% | 6.7% | 18.1% | 7.3% | 8.3% | 7.9% | 1.9% |

In Table 2: $R^1$=total content of Pr and Nd, T=total content of Fe and Co, M=total content of Ga, Cu, Al and Zr, $R^1\%=R^1/(R^1+T+M)$, T %=T/($R^1$+T+M), M %=M/($R^1$+T+M). Taking into account that the oxygen element may be brought in during the preparation of the scanning electron microscope sample, it is not included in the T content.

Further, in table 2, positions 1, 2, 3, 4, 7, 11 are white grain boundary phases, and positions 5, 6, 8, 9, 10 are gray grain boundary phases. From the analysis of the atomic percentage ratio of each element in the gray grain boundary phase, the gray grain boundary phase conforms to the characteristics of the 6:13:1 phase. The white grain boundary phase is a region with a relatively high content of rare earth elements, which is the $R^1$–T–M phase, and the atomic percentage of the rare earth element $R^1$ is greater than 30 at %. The composition of the grain boundary phase in the white area is more complex than that in the gray area, and the ratio of T and M elements varies greatly. The phase composition of the grain boundary phase point 2 in the white zone conforms to the characteristics of the $R^1_{60}T_{20}M_{20}$ phase (3:1:1 phase), the content of $R^1$% is 60~65 at %, and the T % and M % are close to 20 at %; At point 1 and 11, the proportion of each element in the $R^1$–T–M grain boundary phase is that the content of R 1% is greater than 40 at %, the content of M % is less than 2 at %, the content of T % is 30-50 at %, and the content of M element is relatively low; At points 3, 4 and 7, the proportion of each element in the $R^1$–T–M grain boundary phase is that the content of $R^1$% is greater than 40 at %, the content of M %=10~20 at %, the content of T %=20~40 at %, and the content of M element is relatively high.

Figure 3:
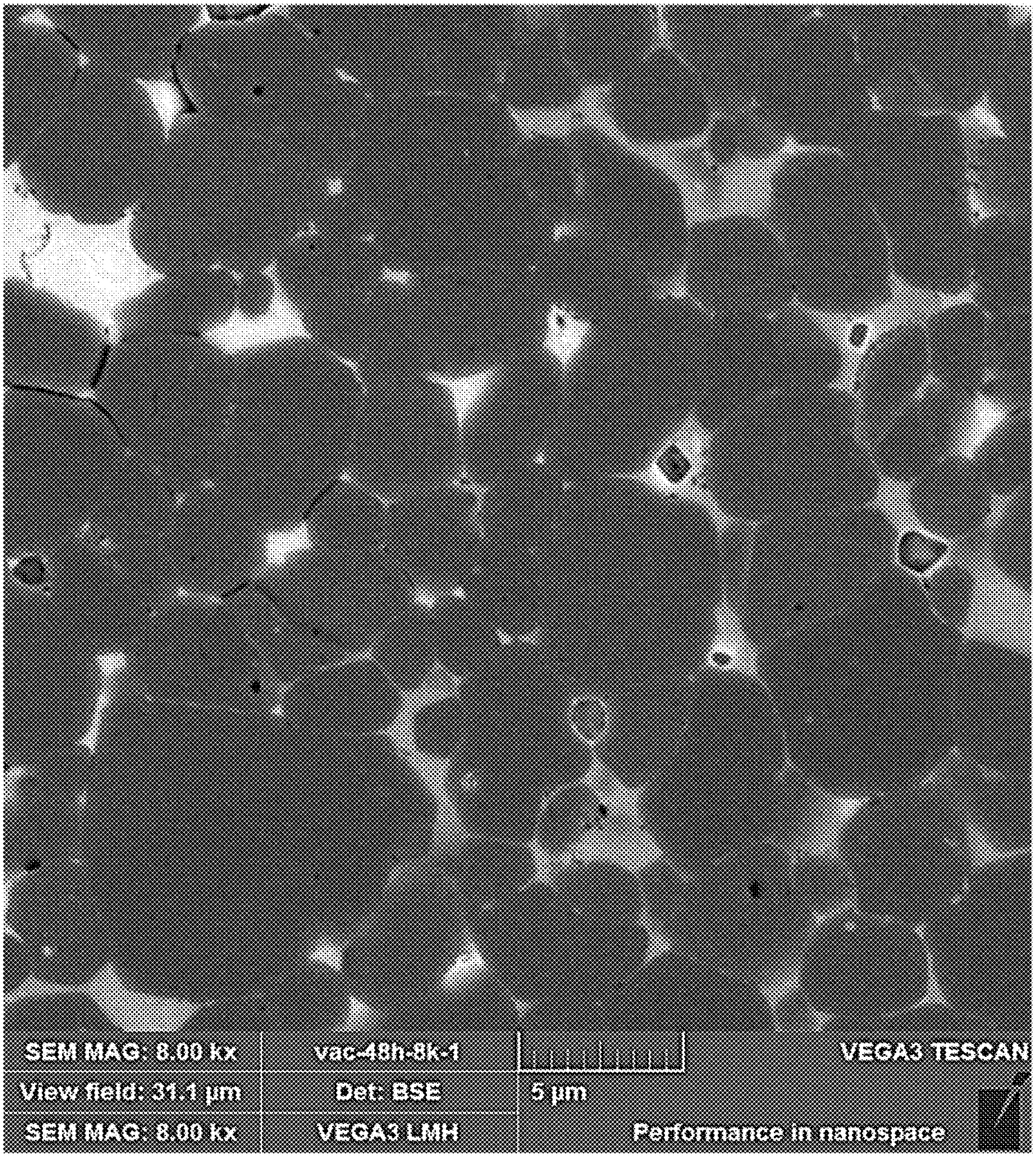
FIG. 3 is an 8000 times BSE electron image 1 of the rare earth magnet of Example 1 of the present disclosure taken along a cross section perpendicular to the orientation direction through scanning electron microscope analysis.
Figure 4:
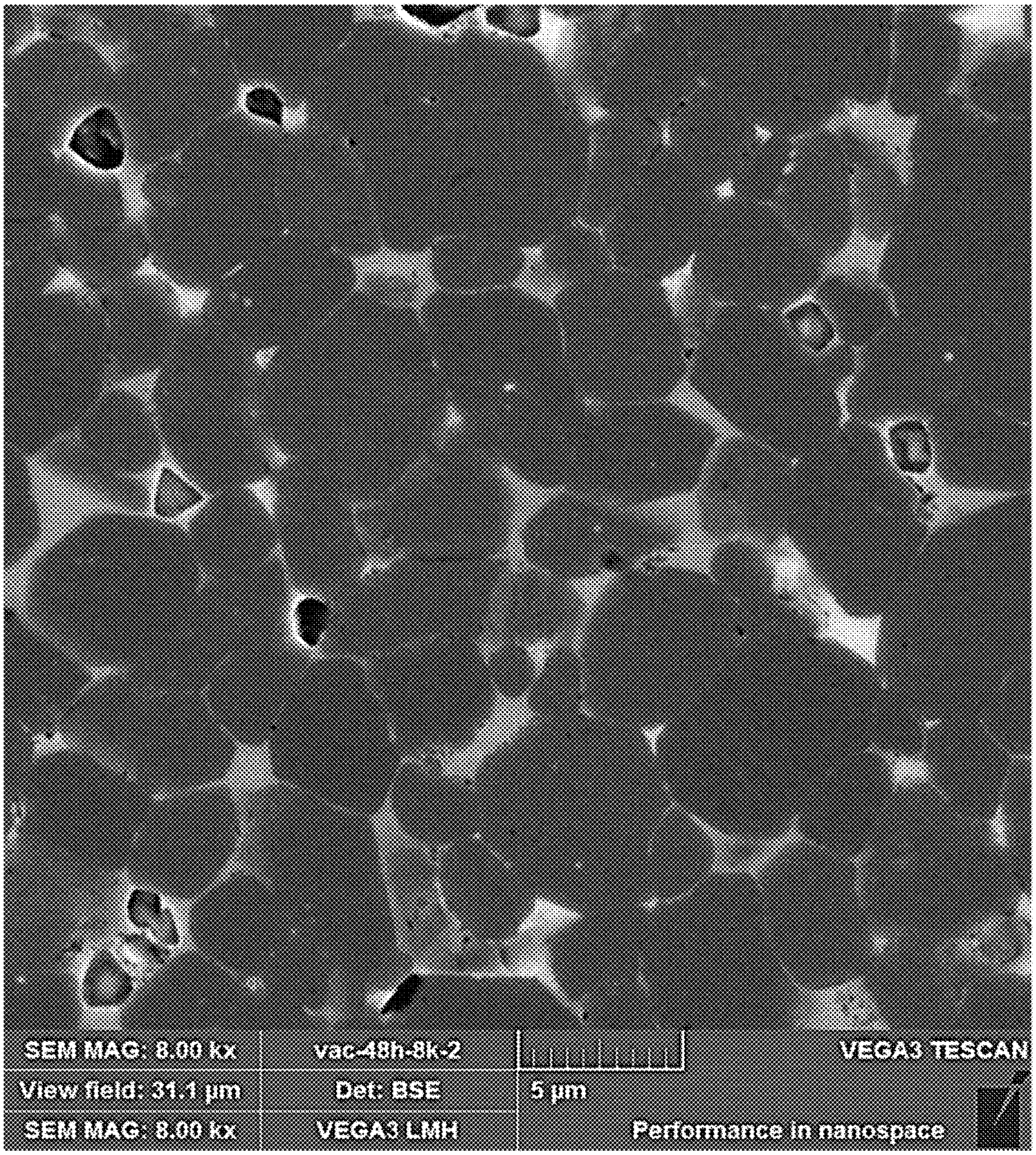
FIG. 4 is an 8000 times BSE electron image 2 of the rare earth magnet in Example 1 of the present disclosure taken along a cross section perpendicular to the orientation direction through scanning electron microscope analysis.
Figure 5:
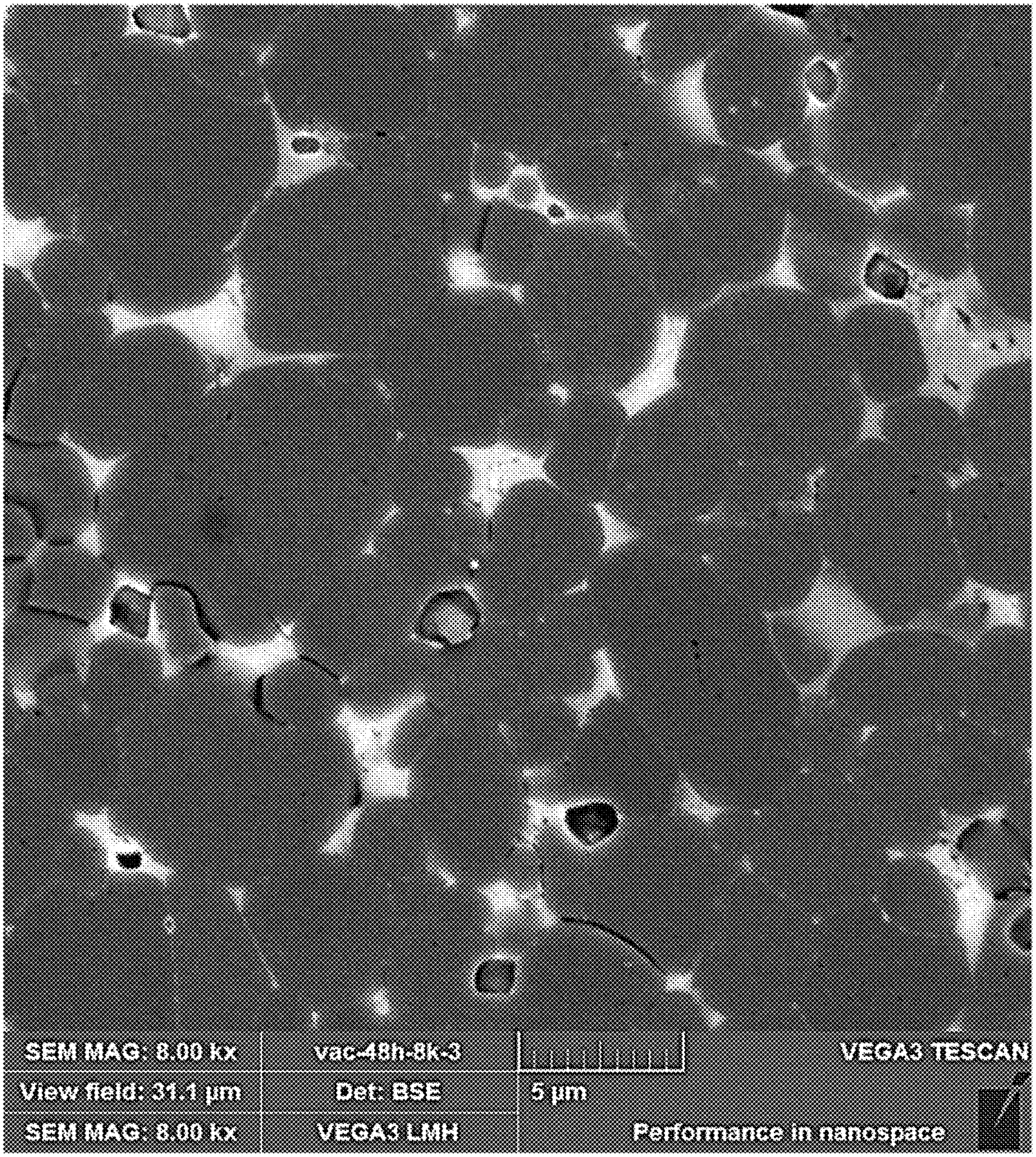
FIG. 5 is an 8000 times BSE electron image 3 of the rare earth magnet of Example 1 of the present disclosure taken along a cross section perpendicular to the orientation direction through scanning electron microscope analysis.

In the above-mentioned scanning electron microscope observation field, select different areas and enlarge the magnification to 8000 times, as shown in FIGS. 3-5, and analyze the grain boundary phase of the magnet with different contrasts. Calculate the percentage of the area of different grain boundary phases to the total area of the selected microstructure observation area, and the results are shown in Table 3 below.

TABLE 3

| TEST ITEMS | FIG. 3 | FIG. 4 | FIG. 5 | Average |
|---|---|---|---|---|
| gray grain boundary phase area/observation area | 8.58% | 9.23% | 8.43% | 8.75% |
| white grain boundary phase area/observation area | 2.62% | 1.72% | 2.93% | 2.42% |

Comparative Example 1

The steps of preparation of sintered magnets are as follows:

1. Prepare the alloy raw materials according to the mass ratio of each element. The mass ratio of each element is $(PrNd)_{31.5}Al_{0.8}Co_{1.0}Cu_{0.1}Ga_{0.51}B_{0.98}Nb_{0.25}Zr_{0.08}Fe_{bal}$.

Steps 2-7 are the same as in Example 1, but step 4 of mixing the main and auxiliary alloy powders is excluded.

Compared with Example 1, the rare earth magnet of Comparative Example 1 has a lower B (Boron) content. The rare earth magnets of Comparative Example 1 are 10 samples randomly selected from the same batch for performance testing. The test results are shown in Table 4 below.

TABLE 4

| Br(kGs) | Hcj(kOe) | Hk/Hcj | $(BH)_{max}$(MGOe) |
|---|---|---|---|
| 12.82~13.19 | 17.82~20.04 | 0.78~0.92 | 40.12~43.24 |

The composition of the magnet and its preparation process in Comparative Example 1 is substantially the same as that of Example 1, except that the composition of B content is lower than that of Example 1. Compared with Example 1, the dispersion of remanence and intrinsic coercivity of Comparative Example 1 is very large, the performance is unstable, and it is not suitable for mass production.

Figure 6:
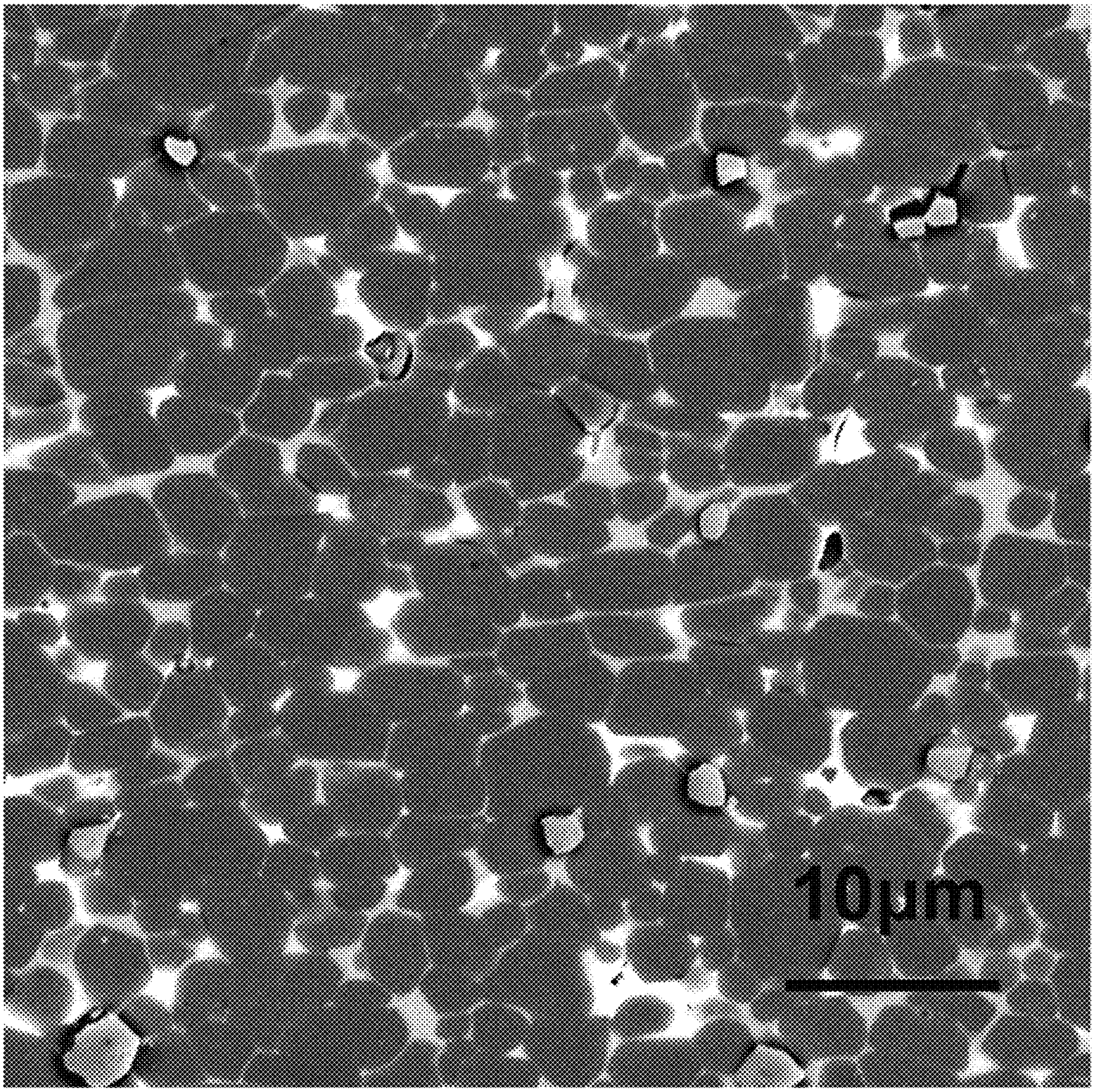
FIG. 6 is a 4000 times BSE electron image of the rare earth magnet 1 of Comparative Example 1 of the present disclosure taken along a cross section perpendicular to the orientation direction through scanning electron microscopy analysis.
Figure 7:
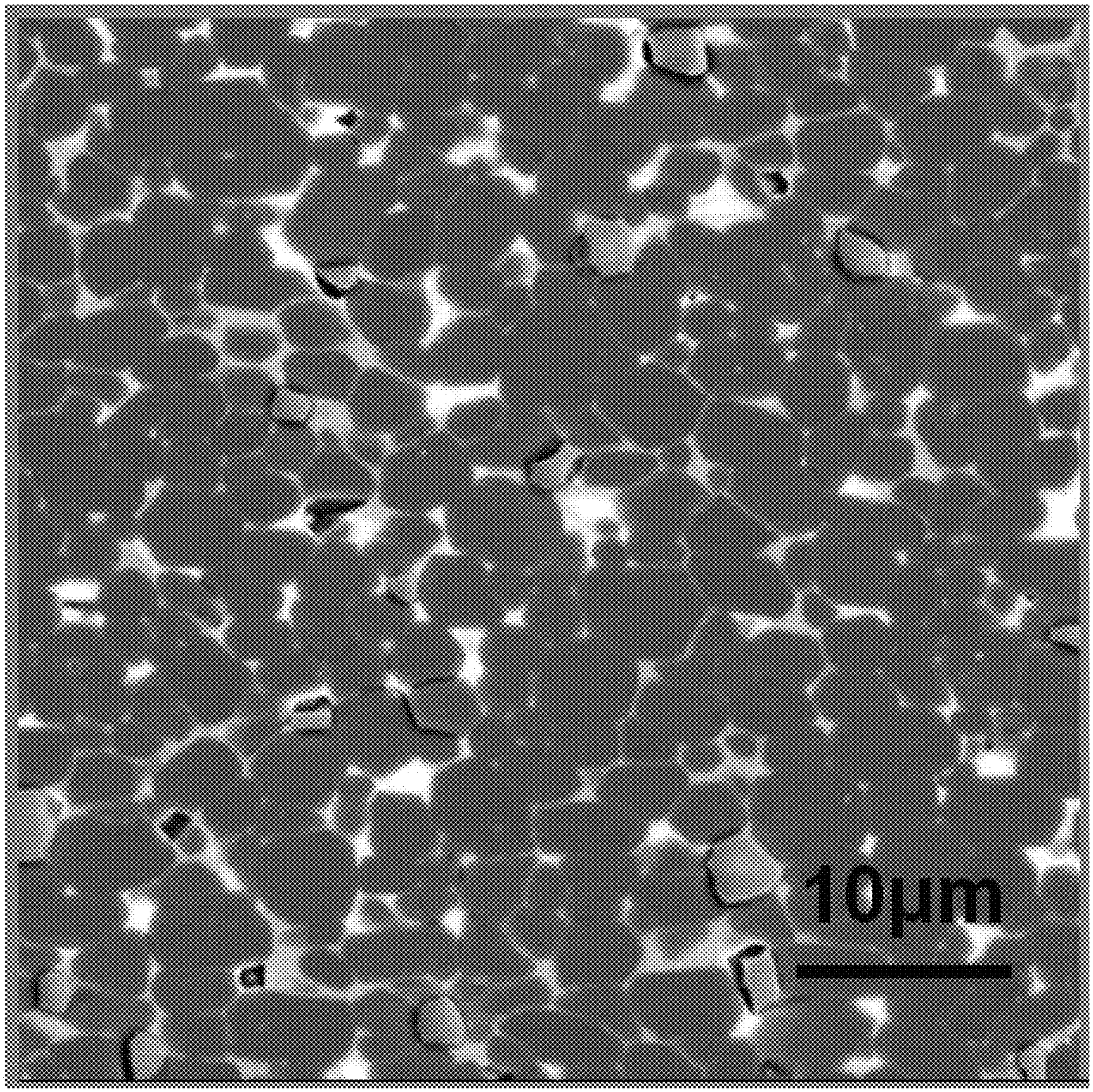
FIG. 7 is a 4000 times BSE electron image of the rare earth magnet 2 of Comparative Example 1 of the present disclosure taken along a cross section perpendicular to the orientation direction through scanning electron microscopy analysis.

Take two magnets of the same batch in Comparative Example 1, and observe the selected microstructure of the cross section of the magnets perpendicular to the orientation direction by scanning electron microscope to obtain 4000 times backscatter (BSE) images, which are shown in FIGS. 6 and 7. The EDS analysis is taken on the white grain boundary phase and gray grain boundary phase components which are enriched in the triangle area. It is found that their gray grain boundary phase has the same 6:13:1 phase as the gray grain boundary phase in Example 1. Their white grain boundary phase is $R^1$–T–M phase, the same as Example 1. The rare earth element $R^1$ content atomic percentage is greater than 30 at %, and the content of T and M varies greatly. Use different contrasts to randomly analyze the grain boundary phase of the magnet, calculate the percentage of the area of the different grain boundary phase to the total area of the -microstructure observation area, and the results are shown in Table 5 below.

TABLE 5

| TEST ITEMS | FIG. 6 | FIG. 7 |
|---|---|---|
| gray grain boundary phase area/observation area | 13.02% | 17.5% |
| white grain boundary phase area/observation area | 2.03% | 2.6% |

When comparing the two samples of Example 1 and Comparative Example 1, it is found that the area ratio of the gray grain boundary phase of the two magnets in Comparative Example 1 is much higher than the area ratio of the gray grain boundary phase in Example 1. Their difference of area ratios of the white grain boundary phase to observation area is small. The inventor believes that the area ratio of the gray grain boundary phase in Comparative Example 1 is higher than that in Example 1, indicating that the magnet in Comparative Example 1 is more likely to generate a gray grain boundary phase during the preparation process, and the gray grain boundary phase is 6:13:1 which is a metastable phase. It is greatly affected by the tempering process, and the process window is narrow. In the mass production of the same batch of magnets in the tempering heat treatment process, the tempering temperature of the individual magnets in the tempering heat treatment furnace cannot be exactly the same, and there will be a deviation, resulting in that different magnets have different transition degree from the 2:17 phase to 6:13:1 phase. Thus the Hcj deviation between the same batch of magnets is big, which is not conducive to mass production.

Example 2

The steps of preparation of sintered magnets are as follows:

1. Prepare the main alloy raw material and the auxiliary alloy raw material are equipped according to the mass ratio of each element. The mass ratio of each element of the main alloy raw material is $(PrNd)_{31}Al_{0.2}Co_{1.0}Cu_{0.1}Ga_{0.6}B_{0.97}Sn_{0.1}Fe_{bal}$. The mass ratio of each element of the auxiliary alloy raw material is $(PrNd)_{32.5}Al_{0.15}Co_{1.0}Cu_{0.1}Ga_{0.6}B_{0.89}Fe_{bal}$.

2. Melt the main alloy raw materials and the auxiliary alloy raw materials in a strip casting furnace with a 600 kg capacity, and cast the scales at a roller speed of 1.5 m/s, and finally obtain the main alloy flakes and auxiliary alloy flakes with an average thickness of 0.25 mm.

3. Subject the main alloy flakes and the auxiliary alloy flakes to hydrogen crushing, specifically, dehydrogenation is performed at 540° C. for 6 hours after saturated hydrogen absorption, and the hydrogen content is 1200 ppm, to obtain medium-sized powder of the main alloy and the auxiliary alloy. The medium pulverized powders of the main alloy and the auxiliary alloy are put into the jet mill to obtain the main alloy powder and the auxiliary alloy powder, respectively, with D50=3.8 μm.

4. Mix the main alloy powder and the auxiliary alloy powder according to the mass ratio of 98:2 to obtain mixed alloy powder.

5. Orient and compress the mixed alloy powder under the magnetic field of an automatic press to form a compact. The orientation magnetic field is 1.8 T and the initial compaction density of the compact is 4.2 g/cm$^3$.

6. Put the compact into a vacuum sintering furnace for sintering at temperature of 1000° C. for 6 h to obtain a sintered magnet. After sintering, the magnet density is 7.52 g/cm$^3$.

The rare earth magnet is prepared by tempering the sintered magnet. Tempering treatment step are as follows:

Primary tempering: heat preservation at 900° C. for 2 h, secondary tempering: heat preservation at 490° C. for 4 h.

Ten samples of the same batch of rare earth magnets of this Example were randomly selected for performance testing. The test results are shown in Table 6 below.

TABLE 6

| Br(kGs) | Hcj(kOe) | Hk/Hcj | $(BH)_{max}$(MGOe) |
|---|---|---|---|
| 13.84~13.89 | 17.13~17.72 | 0.97~0.98 | 46.52~47.06 |

The magnetic properties of 30 batches of rare earth magnets were tested and the results were analyzed as follows:

Set the quality condition Br as 13.8±0.1, Hcj as 17.5±1 kOe, and the calculated results are the CPK of Br is 1.68 and the CPK of Hcj is 1.87.

Comparative Example 2

The steps of preparation of sintered magnets are as follows:

1. Prepare the main alloy raw material and the auxiliary alloy raw material are equipped according to the mass ratio of each element. The mass ratio of each element of the main alloy raw material is $(PrNd)_{31}Al_{0.2}Co_{1.0}Cu_{0.1}Ga_{0.6}B_{0.97}Sn_{0.1}Fe_{bal}$. The mass ratio of each element of the auxiliary alloy raw material is $(PrNd)_{32.5}Al_{0.15}Co_{1.0}Cu_{0.1}Ga_{0.6}B_{0.94}Fe_{bal}$.

The steps 2-7 are the same as Example 2.

Compared with Example 2, the rare earth magnet of Comparative Example 2 has a higher B content in the auxiliary alloy. Ten samples of the same batch of rare earth magnets of this comparative example were randomly selected for performance testing. The test results are shown in Table 7 below.

TABLE 7

| Br(kGs) | Hcj(kOe) | Hk/Hcj | $(BH)_{max}$(MGOe) |
|---|---|---|---|
| 13.73~13.92 | 17.09~18.51 | 0.95~0.97 | 44.13~47.26 |

Comparing Example 2 with Comparative Example 2, the Br and Hcj of Example 2 produced in the same batch have a small deviation, while the Br and Hcj of Comparative Example 2 have a large deviation. The large deviation of the magnetic properties of the magnet will affect the use of motor with the rare earth magnet in it. Hence, Comparative Example 2 is unsuitable for mass production.

Example 3-1

The steps of preparation of sintered diffusion magnets are as follows:

Repeat steps of 1~6 in Example 2

7. Process the sintered magnet into a substrate with a size of 30×20×2 mm, and decrease and pickle the surface.

8. Sputter the substrate to form plating layer and the pressure during sputtering is 0.52 Pa. The substrate passes through the target at a speed of 10 mm/s, and the distance between the target and the substrate is kept at 100 mm. The target material is a Tb target material, the power of sputtering the Tb target material is 25 kW, and the thickness of the Tb plating layer is 6 μm. After sputtering one side of the magnet, the magnet is turned over, and the other surface of the magnet is sputtered according to the same sputtering process to obtain a rare earth sputtering magnet. The thickness of the plating layer is measured by an x-ray fluorescence thickness gauge.

9. Perform grain boundary diffusion treatment on the sputtered rare earth sputtering magnet to obtain a rare earth diffusion magnet. The conditions of the grain boundary diffusion treatment are: primary diffusion treatment: heat preservation at 920° C. for 8 hours, and secondary diffusion treatment: heat preservation at 480° C. for 6 hours.

32 pieces of rare earth diffusion magnets was randomly sampled from the rare earth magnets in this Example for magnetic performance test. The performance test results are shown in Table 8 below.

TABLE 8

| Br(kGs) | Hcj(kOe) | Hk/Hcj | $(BH)_{max}$(MGOe) | $(BH)_{max}$ + Hcj |
|---|---|---|---|---|
| 13.66~13.71 | 27.73~28.52 | 0.97~0.98 | 46.32~47.01 | 74.12~75.51 |

The magnetic properties of 30 batches of rare earth diffusion magnets were tested and the results were analyzed:

Set the quality conditions: Br is 13.7±0.1, Hcj is 28.0±1 kOe. The calculated results are the CPK of Br is 1.35 and the CPK of Hcj is 1.50.

Example 3-2

The steps of preparation of sintered diffusion magnets are as follows:

Example 3-2 is basically the same as Example 3-1. Their difference is that in step 8, when sputtering the substrate, the substrate first passes through the first target which is an Nd target, and the sputtering power is 4 kW. The first plating layer-Nd plating layer is formed with the thickness of 1 μm. After that, the substrate passes through the second target material, the second target material is a Tb target material, and the sputtering power is 24 kW. A second plating layer-Tb plating layer with a thickness of 5.4 μm is formed on the surface of the first plating layer to obtain a rare earth sputtering magnet.

32 pieces of rare earth diffusion magnets was randomly sampled from the rare earth magnets in this Example for magnetic performance test. The performance test results are shown in Table 9 below.

TABLE 9

| Br(kGs) | Hcj(kOe) | Hk/Hcj | $(BH)_{max}$(MGOe) | $(BH)_{max}$ + Hcj |
|---|---|---|---|---|
| 13.71~13.82 | 27.53~28.39 | 0.97~0.98 | 46.68~47.15 | 74.25~75.41 |

The magnetic properties of 30 batches of rare earth diffusion magnets were tested and the results were analyzed:

Set the quality conditions: Br is 13.8±0.1, Hcj is 28.0±1 kOe. The calculated results are the CPK of Br is 1.67 and the CPK of Hcj is 1.77.

Example 3-3

The steps of preparation of sintered diffusion magnets are as follows:

Example 3-3 is basically the same as Example 3-1. The difference is that in step 8, when sputtering the substrate, the substrate first passes through the first target which is an Nd target, and the sputtering power is 4 kW. The first plating layer-Nd plating layer is formed with the thickness of 1 μm. Then the substrate passes through the second target material which is a Tb target material and the sputtering power is 17 kW. The second plating layer-Tb plating layer is formed on the surface of the first plating layer with a thickness of 3.5 μm. Then the substrate passes through the third target material which is a Dy target material and the sputtering power is 10 kW. The third plating layer-Dy plating layer is formed on the surface of the second plating layer with a thickness of 1.8 μm.

32 pieces of rare earth diffusion magnets was randomly sampled from the rare earth magnets in this Example for magnetic performance test. The performance test results are shown in Table 10 below.

TABLE 10

| Br(kGs) | Hcj(kOe) | Hk/Hcj | $(BH)_{max}$(MGOe) | $(BH)_{max}$ + Hcj |
|---|---|---|---|---|
| 13.72~13.82 | 27.51~28.18 | 0.97~0.98 | 46.47~47.01 | 74.12~75.15 |

The magnetic properties of 30 batches of rare earth diffusion magnets were tested and the analysis results are as follows:

Set the quality conditions: Br is 13.8±0.1, Hcj is 28.0±1 kOe. The calculated results are the CPK of Br is 1.67 and the CPK of Hcj is 1.77.

Comparing Example 3-1, 3~2 and 3~3, Example 3-2 and 3~3 have relatively higher Br and better magnetic properties, and the CPK values of Br and Hcj are also higher. Example 3-3 can reduce the amount of part of the Tb target used compared to 3~2, and can further reduce the cost.

Comparative Example 3-1

1. The alloy raw materials are prepared according to the mass ratio of each element, The mass ratio of each element of the alloy raw materials is $(PrNd)_{32.5}Al_{0.1}Co_{1.0}Cu_{0.1}Ga_{0.51}B_{0.89}Fe_{bal}$.

2. Melt the alloy raw materials in a strip casting furnace with a 600 kg capacity, and perform scale casting at a roller speed of 1.5 m/s, and finally obtain an alloy flake with an average thickness of 0.15 mm.

3. Subject the alloy flakes to hydrogen crushing, specifically, dehydrogenate is performed at 540° C. for 6 hours after saturated hydrogen absorption, and the hydrogen content after dehydrogenation is 1200 ppm, to obtain the alloy's medium powder. The medium pulverized powder of the alloy was put into the jet mill to obtain the alloy powder with D50=3.6 μm.

4. Orient and compress the alloy powder under the magnetic field of an automatic press to form a compact. The orientation magnetic field is 1.8 T and the initial compaction density of the compact is 4.2 g/cm$^3$.

5. Put the compact into a vacuum sintering furnace for sintering at temperature of 1000° C. for 6 h to obtain a sintered magnet. After sintering, the magnet density is 7.52 g/cm$^3$.

6. Process the sintered magnet into a substrate with a size of 30×20×2 mm, and decrease and pickle the surface.

7. Sputter the substrate to form plating layer and the pressure during sputtering is 0.52 Pa. The substrate passes through the target at a speed of 10 mm/s, and the distance between the target and the substrate is kept at 100 mm. The target is a Tb target, the power of sputtering the Tb target is 20 kW, and the thickness of the Tb plating layer is 4 μm. After sputtering one side of the magnet, the magnet is turned over, and the other surface of the magnet is sputtered according to the same sputtering process to obtain a rare earth sputtering magnet.

8. Carry out grain boundary diffusion treatment on rare earth sputtering magnet to obtain rare earth diffusion magnet. The conditions of grain boundary diffusion treatment are: primary diffusion treatment: heat preservation at 920° C. for 8 h, secondary diffusion treatment: heat preservation at 480° C. for 6 h.

32 pieces of rare earth diffusion magnets was randomly sampled from the rare earth magnets in this Comparative Example for magnetic performance test. The performance test results are shown in Table 11 below.

TABLE 11

| Br(kGs) | Hcj(kOe) | Hk/Hcj | $(BH)_{max}$(MGOe) | $(BH)_{max}$ + Hcj |
|---|---|---|---|---|
| 13.55~13.80 | 23.46~26.29 | 0.80~0.93 | 43.80~46.25 | 67.13~73.24 |

The content of B in the rare earth diffusion magnets of Comparative Example 3-1 is lower than that of Example 3-1, and the rest is basically the same. Comparing the performance of the two magnets, the properties of the magnets of Example 3-1 are significantly better than those of Comparative Example 3-1. By increasing the content of B in the magnet and controlling the content of Ga, the disclosure can obviously improve the comprehensive performance of the rare earth diffusion magnet.

Comparative Example 3-2

The steps of preparation of sintered diffusion magnets are as follows:

The preparation of rare-earth magnets is the same as in Example 3-2, and the preparation process of rare-earth sputtering magnets and rare-earth diffusion magnets is basically the same as that of Example 3-2, except that: in step 8, when sputtering the substrate, the substrate passes the first target material which is an Al target material, the sputtering power is 4 kW, and the first plating layer-Al plating layer is formed on the substrate with a thickness of 1 μm. After that, the substrate passes through the second target material which is a Tb target material, the sputtering power is 24 kW, and the second plating layer-Tb plating layer is formed on the surface of the first plating layer with a thickness of 5.4 μm.

32 pieces of rare earth diffusion magnets was randomly sampled from the rare earth magnets in this Comparative Example for magnetic performance test. The performance test results shown in Table 12 below.

TABLE 12

| Br(kGs) | Hcj(kOe) | Hk/Hcj | $(BH)_{max}$(MGOe) | $(BH)_{max}$ + Hcj |
|---|---|---|---|---|
| 13.65~13.74 | 26.35~26.96 | 0.94~0.95 | 45.18~46.02 | 71.83~72.81 |

The magnetic properties of 30 batches of rare earth diffusion magnets were tested and the results were analyzed:

Set quality conditions: Br is 13.7±0.1, Hcj is 26.0±1 kOe. The calculated results are CPK of Br is 1.50 and CPK of Hcj is 1.65.

The properties of the rare earth diffusion magnets of Comparative Example 3-2 are compared with those of Example 3-2. The properties of the magnets of Example 3-2 are significantly better than those of Comparative Example 3-2. It can be seen that the improvement effect of magnetic properties of the rare earth diffusion magnets with Al in the first plating layer is not as good as the rare earth diffusion magnet with Nd in the first plating layer.

Example 4

The steps of preparation of sintered magnets are as follows:

1. Prepare the main alloy raw materials and auxiliary alloy raw materials according to the mass ratio of each element. The mass ratio of each element of the main alloy raw material is $(PrNd)_{30}Al_{0.05}Co_{0.7}Cu_{0.2}Ga_{0.4}B_{0.97}Fe_{bal}$, and the mass ratio of each element of the auxiliary alloy raw material It is $(PrNd)_{32.5}Al_{0.15}Co_{1.0}Cu_{0.2}Ga_{0.4}B_{0.89}Fe_{bal}$.

2. Melt the main alloy raw materials and the auxiliary alloy raw materials in a strip casting furnace with a 600 kg capacity, and the scale is cast at a roller speed of 1.5 m/s, and the main alloy flakes and auxiliary alloy flakes with an average thickness of 0.15 mm are finally obtained.

3. Hydrogen pulverize the main alloy flakes and the auxiliary alloy flakes separately, specifically, dehydrogenation is carried out at 540° C. for 6 hours after saturated hydrogen absorption, and the hydrogen content after dehydrogenation is 1200 ppm to obtain medium-sized powder of the main alloy and auxiliary alloy. The medium pulverized powders of the main alloy and the auxiliary alloy are put into the jet mill to obtain the main alloy powder and the auxiliary alloy powder, respectively, with D50=3.6 μm.

4. Mix the main alloy powder and the auxiliary alloy powder according to the mass ratio of 99:1 to obtain mixed alloy powder.

5. Orient and compress the mixed alloy powder under the magnetic field of an automatic press to form a compact. The orientation magnetic field is 1.8 T and the initial compaction density of the compact is 4.1 g/cm$^3$.

6. Put the compact into a vacuum sintering furnace for sintering at temperature of 1010° C. for 5 h to obtain a sintered magnet. After sintering, the magnet density is 7.51 g/cm$^3$.

The rare earth magnet is prepared by tempering the sintered magnet; Tempering treatment step are as follows:

Primary tempering: heat preservation at 920° C. for 2 h, secondary tempering: heat preservation at 490° C. for 8 h.

For the rare earth magnet of this Example, 10 samples of the same batch of samples are randomly measured for performance testing. The test results are shown in Table 13 below.

TABLE 13

| Br(kGs) | Hcj(kOe) | Hk/Hcj | $(BH)_{max}$(MGOe) |
|---|---|---|---|
| 14.22~14.27 | 14.79~15.37 | 0.96~0.97 | 49.65~50.33 |

The magnetic properties of 30 batches of rare earth magnets were tested, and the analysis results are as follows:

Set quality conditions: Br is 14.2±0.1, Hcj is 15.0±1 kOe. The calculated results are CPK of Br is 1.71 and CPK of Hcj is 1.77.

Comparative Example 4

1. Prepare the alloy raw materials according to the mass ratio of each element. The mass ratio of each element of the alloy raw material is $(PrNd)_{30}Al_{0.05}Co_{0.7}Cu_{0.2}Ga_{0.4}B_{0.90}Fe_{bal}$.

Steps 2-7 are the same as in Example 4, but Step 4 of mixing the main and auxiliary alloy mixing is excluded.

For the rare earth magnet of Comparative Example 4, 10 samples of the same batch of samples were randomly measured for performance testing. The test results are shown in Table 14 below.

TABLE 14

| Br(kGs) | Hcj(kOe) | Hk/Hcj | $(BH)_{max}$(MGOe) |
|---|---|---|---|
| 13.94~14.23 | 14.09~16.35 | 0.82~0.91 | 46.77~49.68 |

The rare earth magnet of Comparative Example 4 has a very large dispersion of remanence and intrinsic coercivity, and its performance is unstable, which is not suitable for mass production.

Comparing Example 4 and Comparative Example 4, the squareness of the demagnetization curve of Example 4 is significantly better than that of Comparative Example 4, and the rare earth magnet of Example 4 has stable performance and is suitable for mass production.

Example 5-1

The steps of preparation of sintered diffusion magnets are as follows:

Repeat steps of 1~6 in Examples 4.

7. Process the tempered rare earth magnet into a substrate with a size of 30×20×2 mm, and decrease and pickle the surface.

8. Sputter the substrate to form plating layer and the pressure during sputtering is 0.52 Pa. The substrate passes through the target at a speed of 10 mm/s, and the distance between the target and the substrate is kept at 95 mm. The target material is a Tb target material, the power of sputtering the Tb target material is 25 kW, and the thickness of the Tb plating layer is 10 μm. After sputtering one side of the magnet, the magnet is turned over, and the other surface of the magnet is sputtered according to the same sputtering process to obtain a rare earth sputtering magnet.

9. Carry out grain boundary diffusion treatment on rare earth sputtering magnet to obtain rare earth diffusion magnet. The conditions of the grain boundary diffusion treatment are: primary diffusion treatment: heat preservation in the range of 950° C. for 7 hours, and secondary diffusion treatment: heat preservation in the range of 480° C. for 8 hours.

32 pieces of rare earth diffusion magnets was randomly sampled from the rare earth magnets in this Example for magnetic performance test. The performance test results are shown in Table 15 below.

TABLE 15

| Br(kGs) | Hcj(kOe) | Hk/Hcj | $(BH)_{max}$(MGOe) | $(BH)_{max}$ + Hcj |
|---|---|---|---|---|
| 14.01~14.14 | 25.75~26.19 | 0.96~0.97 | 49.35~50.17 | 75.1~76.36 |

The magnetic properties of 30 batches of rare earth diffusion magnets were tested and the analysis results are as follows:

Set quality conditions: Br is 14.1±0.1, Hcj is 25.5±1 kOe. The calculated results are CPK of Br is 1.71 and CPK of Hcj is 1.77.

Example 5-2

The steps of preparation of sintered diffusion magnets are as follows:

It is basically the same as Example 5-1, except that: in step 8, when sputtering the substrate, the substrate first passes through the first target which an Nd target and the sputtering power of 6 kW. The first plating layer-Nd plating layer is formed on the substrate with a thickness of 2 μm. After that, the substrate passes through the second target material which is a Tb target material and the sputtering power is 25 kW. The second plating layer-Tb plating layer is formed on the surface of the first plating layer with a thickness of 8.5 μm.

32 pieces of rare earth diffusion magnets was randomly sampled from the rare earth magnets in this Example for magnetic performance test. The performance test results are shown in Table 16 below.

TABLE 16

| Br(kGs) | Hcj(kOe) | Hk/Hcj | $(BH)_{max}$(MGOe) | $(BH)_{max}$ + Hcj |
|---|---|---|---|---|
| 13.91~14.05 | 25.63~25.92 | 0.97~0.98 | 49.48~49.87 | 73.01~73.75 |

The magnetic properties of 30 batches of rare earth diffusion magnets were tested and the analysis results are as follows:

Set the quality conditions: Br is 14.0±0.1, Hcj is 25.5±1 kOe. The calculated results are CPK of Br is 1.65 and CPK of Hcj is 1.75.

Example 5-3

The steps of preparation of sintered diffusion magnets are as follows:

It is basically the same as Example 5-1, except that: in step 8, when sputtering the substrate, the substrate first passes through the first target which an Nd target, and the sputtering power is 5 kW. The first plating layer-Nd plating layer is formed with a thickness of 1.5 μm. After that, the substrate passes through the second target material which is a Tb target material and the sputtering power is 25 kW. The second plating layer-Tb plating layer is formed on the surface of the first plating layer with a thickness of 7.5 μm. After that, the substrate passes through the third target material, which is a Dy target material and the sputtering power is 12 kW. The third plating layer-Dy plating layer is formed on the surface of the second plating layer with a thickness of 2 μm.

32 pieces of rare earth diffusion magnets are randomly sampled from the rare earth magnets in this Example for magnetic performance test. The performance test results are shown in Table 17 below.

TABLE 17

| Br(kGs) | Hcj(kOe) | Hk/Hcj | $(BH)_{max}$(MGOe) | $(BH)_{max}$ + Hcj |
|---|---|---|---|---|
| 14.20~14.25 | 23.52~23.89 | 0.97~0.98 | 49.48~49.92 | 73.00~73.81 |

The magnetic properties of 30 batches of rare earth diffusion magnets were tested and the analysis results are as follows:

Set the quality conditions: Br is 14.2±0.1, Hcj is 23.5±1 kOe. The calculated results are CPK of Br is 1.67 and CPK of Hcj is 1.74.

Example 6-1

1. Prepare the main alloy raw materials and auxiliary alloy raw materials according to the mass ratio of each element. The mass ratio of each element of the main alloy raw material is $(PrNd)_{30}Ho_{0.5}Dy_{1}Tb_{0.5}Al_{0.2}Co_{1.0}Cu_{0.1}Ga_{0.51}B_{1.0}Fe_{bal}$, auxiliary alloy raw material. The mass ratio of each element is $(PrNd)_{32.5}Al_{0.15}Co_{1.0}Cu_{0.1}Ga_{0.51}B_{0.82}Fe_{bal}$.

2. Melt the main alloy raw materials and the auxiliary alloy raw materials in a strip casting furnace with a 600 kg capacity, and the scale is cast at a roller speed of 1.5 m/s, and the main alloy flakes and auxiliary alloy flakes with an average thickness of 0.15 mm are finally obtained.

3. Hydrogen pulverize the main alloy flakes and the auxiliary alloy flakes separately, specifically, dehydrogenation is carried out at 540° C. for 6 hours after saturated hydrogen absorption, and the hydrogen content after dehydrogenation is 1200 ppm to obtain medium-sized powder of the main alloy and auxiliary alloy. The medium pulverized powders of the main alloy and the auxiliary alloy are put into the jet mill to obtain the main alloy powder and the auxiliary alloy powder, respectively, with D50=3.6 μm.

4. Mix the main alloy powder and the auxiliary alloy powder according to the mass ratio of 98:2 to obtain mixed alloy powder.

5. Orient and compress the mixed alloy powder under the magnetic field of an automatic press to form a compact. The orientation magnetic field is 1.8 T and the initial compaction density of the compact is 4.2 $g/cm^3$.

6. Put the compact into a vacuum sintering furnace for sintering at temperature of 1000° C. for 6 hours to obtain a sintered magnet. After sintering, the magnet density is 7.55 $g/cm^3$.

7. Process the sintered magnet into a substrate with a size of 30×20×2 mm, and decrease and pickle the surface.

8. Sputter the substrate to form plating layer and the pressure during sputtering is 0.52 Pa. The substrate passes through the target at a speed of 10 mm/s, and the distance between the target and the substrate is kept at 100 mm. The target material is a Tb target material, the power of sputtering the Tb target material is 24 kW, and the thickness of the Tb plating layer is 5.4 μm. After sputtering one side of the magnet, the magnet is turned over, and the other surface of the magnet is sputtered according to the same sputtering process to obtain a rare earth sputtering magnet.

9. Carry out grain boundary diffusion treatment on rare earth sputtering magnet to obtain rare earth diffusion magnet. The conditions of grain boundary diffusion treatment are: primary treatment: heat preservation at 920° C. for 8 h, secondary diffusion treatment: heat preservation at 480° C. for 6 h.

32 pieces of rare earth diffusion magnets are randomly sampled from the rare earth magnets in this Example for magnetic performance test. The performance test results are shown in Table 18 below.

TABLE 18

| Br(kGs) | Hcj(kOe) | Hk/Hcj | $(BH)_{max}$(MGOe) | $(BH)_{max}$ + Hcj |
|---|---|---|---|---|
| 13.32~13.46 | 32.73~33.52 | 0.97~0.98 | 44.18~45.11 | 76.91~78.53 |

The magnetic properties of 30 batches of rare earth diffusion magnets were tested and the results were analyzed:

Set quality conditions: Br is 13.4±0.1, Hcj is 33.0±1 kOe. The calculated results are CPK of Br is 1.35 and CPK of Hcj is 1.65.

Example 6-2

The steps of preparation of sintered diffusion magnets are as follows:

Basically the same as Example 6-1, except that in step 8, when sputtering the substrate, the substrate first passes through the first target which is a Pr target, and the sputtering power is 4 kW. The first plating layer-Pr plating layer is formed with a thickness of 1 μm. After that, the substrate passes through the second target material which is a Tb target material and the sputtering power is 22 kW. The second plating layer-Tb plating layer is formed on the surface of the first plating layer with a thickness of 4.4 μm.

32 pieces of rare earth diffusion magnets are randomly sampled from the rare earth magnets in this Example for magnetic performance test. The performance test results are shown in Table 19 below.

TABLE 19

| Br(kGs) | Hcj(kOe) | Hk/Hcj | $(BH)_{max}$(MGOe) | $(BH)_{max}$ + Hcj |
|---|---|---|---|---|
| 13.52~13.56 | 32.53~33.39 | 0.97~0.98 | 44.91~45.46 | 77.44~78.72 |

The magnetic properties of 30 batches of rare earth diffusion magnets were tested and the results were analyzed.

Set quality conditions: Br is 13.5±0.1, Hcj is 33.0±1 kOe. The calculated result are CPK of Br is 1.67, and the CPK of Hcj is 1.77.

Example 6-3

The steps of preparation of sintered diffusion magnets are as follows:

Basically the same as Example 6-1, except that in step 8, when sputtering the substrate, the substrate first passes through the first target which is a PrCu target and the sputtering power is 4 kW. The first plating layer-Nd plating layer is formed on the substrate with a thickness of 1 μm. After that, the substrate passes through the second target material which is a Tb target material and the sputtering power is 15 kW. The second plating layer-Tb plating layer is formed on the surface of the first plating layer with a thickness of 2.8 μm. After that, the substrate passes through the third target material, which is a Dy target material and the sputtering power is 12 kW. The third plating layer-Dy plating layer is formed on the surface of the second plating layer with a thickness of 2 μm.

32 pieces of rare earth diffusion magnets was randomly sampled from the rare earth magnets in this Example for magnetic performance test. The performance test results are shown in Table 20 below.

TABLE 20

| Br(kGs) | Hcj(kOe) | Hk/Hcj | $(BH)_{max}$(MGOe) | $(BH)_{max}$ + Hcj |
|---|---|---|---|---|
| 13.55~13.60 | 32.41~33.18 | 0.97~0.98 | 45.09~45.62 | 77.51~78.80 |

The magnetic properties of 30 batches of rare earth diffusion magnets were tested and the analysis results are as follows:

Set quality conditions: Br is 13.6±0.1, Hcj is 33.0±1 kOe. The calculated results are CPK of Br is 1.58 and CPK of Hcj is 1.77.

According to Example 6-1, 6~2 and 6~3, the solution of the present disclosure can obtain an ultra-high-performance magnet whose maximum magnetic energy product $(BH)_{max}$ and the intrinsic coercivity Hcj are greater than 75, And the magnet performance is stable, suitable for mass production. Comparing Example 6-1, 6~2 and 6~3, Example 6-2 and 6~3 have relatively higher Br and better magnetic properties, while the CPK values of Br and Hcj are also higher. Compared with 6~2, Example 6-3 can reduce the amount of Tb target materials used in part, and can further reduce the cost.

Example 7

1. Prepare the main alloy raw materials and auxiliary alloy raw materials according to the mass ratio of each element. The mass ratio of each element of the main alloy raw material is $(PrNd)_{29.2}Tb_{1.8}Al_{0.1}Co_{1.0}Cu_{0.1}Ga_{0.3}B_{0.97}Fe_{bal}$, and the mass ratio of each element of the auxiliary alloy raw material is $(PrNd)_{32.5}Al_{0.1}Co_{1.0}Cu_{0.1}Ga_{0.3}B_{0.89}Fe_{bal}$.

Steps 2~5 are the same as EXAMPLE 6-1.

6. Put the compact into a vacuum sintering furnace for sintering at temperature of 1000° C. for 6 h to obtain a sintered magnet. After sintering, the magnet density is 7.59 g/cm$^3$.

The rare earth magnet is prepared by tempering the sintered magnet; Tempering treatment step are as follows:

Primary tempering: heat preservation at 920° C. for 2 h, secondary tempering: heat preservation at 475° C. for 6 h.

Measure the same batch of samples after tempering, and randomly select 10 samples for performance testing. The test results are shown in Table 21 below.

TABLE 21

| Br(kGs) | Hcj(kOe) | Hk/Hcj | $(BH)_{max}$(MGOe) |
|---|---|---|---|
| 14.12~14.22 | 20.12~20.55 | 0.96~0.98 | 48.05~49.52 |

8. Process the rare earth magnet after step 7 of tempering into a substrate with a size of 30×20×2 mm, and decrease and pickle the surface.

9. Sputter the substrate to form plating layer and the pressure during sputtering is 0.55 Pa. The substrate passes through the target at a speed of 10 mm/s, and the distance between the target and the substrate is kept at 95 mm. The substrate first passes through the first target material which is an Nd target material and the sputtering power is 4 kW. The first plating layer-Nd plating layer is formed on the substrate with a thickness of 1 μm. After that, the substrate passes through the second target material which is a Tb target material and the sputtering power is 22 kW. The second plating layer-Tb plating layer is formed on the surface of the first plating layer with a thickness of 4.5 μm. After that, the substrate passes through the third target material, which is a Dy target material and the sputtering power is 8 kW. The third plating layer-Dy plating layer is formed on the surface of the second plating layer with a thickness of 1.6 μm. After sputtering one side of the magnet, the magnet is turned over, and the other surface of the magnet is sputtered according to the same sputtering process to obtain a rare earth sputtering magnet.

10. Carry out grain boundary diffusion treatment on rare earth sputtering magnet to obtain rare earth diffusion magnet. The conditions of grain boundary diffusion treatment are: primary diffusion treatment: heat preservation at 920° C. for 8 h, secondary diffusion treatment: heat preservation at 480° C. for 6 h.

32 pieces of rare earth diffusion magnets are randomly sampled from the rare earth magnets in this Example for magnetic performance test. The performance test results are shown in Table 22 below.

TABLE 22

| Br(kGs) | Hcj(kOe) | Hk/Hcj | $(BH)_{max}$(MGOe) | $(BH)_{max}$ + Hcj |
|---|---|---|---|---|
| 13.99~14.07 | 30.06~30.58 | 0.97~0.98 | 48.65~49.07 | 78.71~79.63 |

The magnetic properties of 30 batches of rare earth diffusion magnets were tested and the results were analyzed:

Set quality conditions: Br is 14.0±0.1, Hcj is 30.0±1 kOe. The calculated results are CPK of Br is 1.67 and CPK of Hcj is 1.78.

According to this Example, the solution of the present disclosure can obtain an ultra-high performance magnet. The sum of the maximum magnetic energy product $(BH)_{max}$ of the magnet and the intrinsic coercivity Hcj is greater than 75, and the magnet performance is stable, which is suitable for large Scale production.

Figure 8:
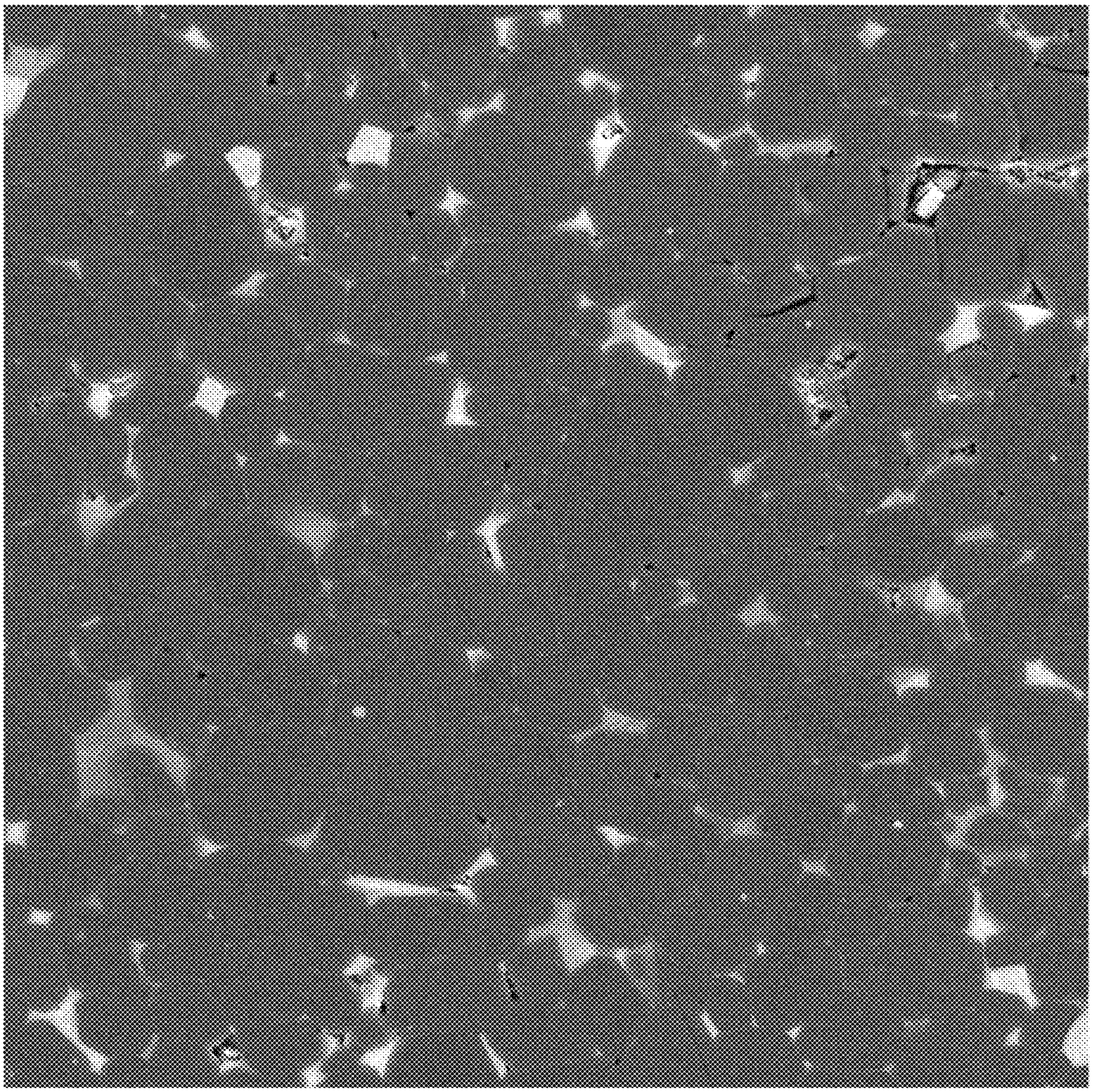
FIG. 8 is a 4000 times BSE electron image of the rare earth magnet after tempering in Example 7 of the present disclosure taken along a cross section perpendicular to the orientation direction through the scanning electron microscope analysis.
Figure 9:
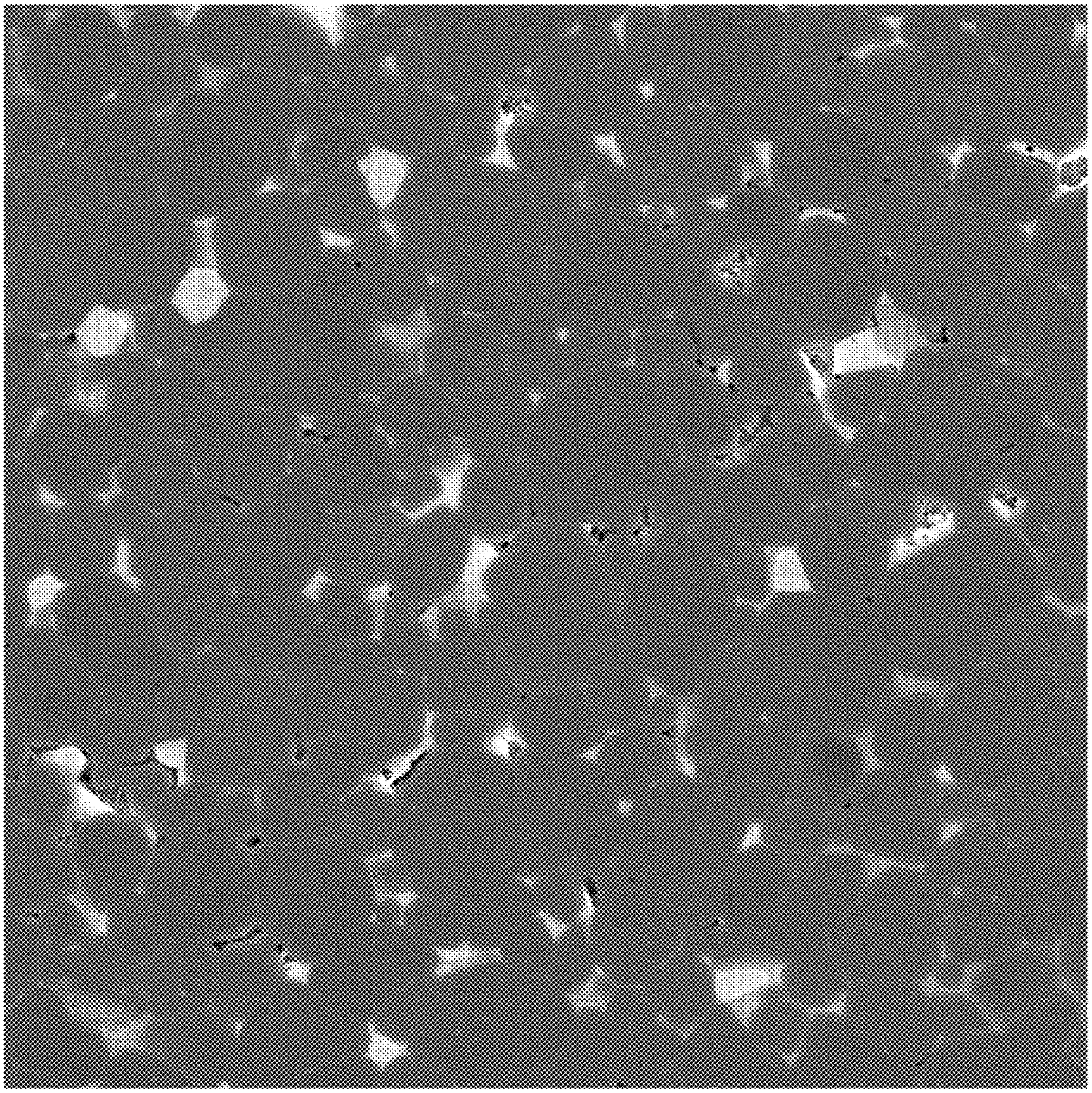
FIG. 9 is a 4000 times BSE electron image of the rare earth magnet of Example 7 of the present disclosure taken along a cross section perpendicular to the orientation direction through scanning electron microscope analysis.

Through the scanning electron microscope, the cross section of the rare-earth magnet and the cross section of the rare-earth diffusion magnet perpendicular to the orientation direction were observed to obtain 4000 times backscattering (BSE) images as shown in FIG. 8 and FIG. 9. Perform analysis of the grain boundary phase of the magnet by using different contrast and calculate the percentage of the area of different gray grain boundary phases to the total area of the selected microstructure observation area and the percentage of white grain boundary phases to the total area of the selected microstructure observation area. The results are shown in Table 23 below.

TABLE 23

| TEST ITEMS | FIG. 8 | FIG. 9 |
|---|---|---|
| gray grain boundary phase area/observation area | 3.48% | 2.88% |
| white grain boundary phase area/observation area | 2.47% | 2.63% |

EDS analyzed the components of the white and gray grain boundary phases enriched in the triangle area, and found that their gray grain boundary phases are 6:13:1 phase, the same as the gray grain boundary phases in Example 1; the composition of white grain boundary phases is $R^1$–T–M phase, also the same as the white grain boundary phase in Example 1. The content of rare earth element $R^1$ that does not include Dy and Tb is greater than 30 at %, and the content of T and M varies greatly. The tempered rare earth magnets and rare earth diffusion magnets (namely rare earth magnet after diffusion) in FIGS. 8 and 9 have similar white grain boundary phase area ratios, which are in the range of 1~3% as in Example 1. Compared with the gray grain boundary phase area ratio of the rare earth magnet and the rare earth diffusion magnet, there is basically little change, indicating that the area ratio of the grain boundary phase before and after the diffusion of the rare earth magnet barely changes. Compared with Example 1, it is obvious that the area ratio of the gray grain boundary phase of the tempered rare earth magnet and the rare earth diffusion magnet of Example 7 is much lower. The reduction in the ratio of the gray grain boundary phase and the white grain boundary phase in the magnet can increase the ratio of the main phase, thereby increasing the Br of the magnet. In this way, a diffusion substrate with high Br and Hcj can be obtained. After heavy rare earth diffusion treatment, an ultra-high performance magnet with the sum of the maximum magnetic energy product $(BH)_{max}$ and the intrinsic coercivity Hcj greater than 75 can be finally obtained. According to the selected microstructure analysis in FIG. 9, it is found that the for ultra-high performance magnet with sum of the maximum magnetic energy product $(BH)_{max}$ and the intrinsic coercivity Hcj greater than 75, its gray grain boundary phase area ratio should be controlled at 2~4%. Its white grain boundary phase area ratio should be controlled at 1~3%.

Example 8

1. Prepare the main alloy raw materials and auxiliary alloy raw materials according to the mass ratio of each element. The mass ratio of each element of the main alloy raw material is $(PrNd)_{30.5}Dy_2Al_{0.95}Co_{1.0}Cu_{0.1}Ga_{0.52}B_{0.96}Fe_{bal}$. The mass ratio is $(PrNd)_{32.5}Co_{1.0}Ga_{0.51}B_{0.85}Fe_{bal}$.

Steps 2~5 are the same as in Example 6-1, but the mass mixing ratio of the main and auxiliary alloys in Step 4 is 95:5.

6. Put the compact into a vacuum sintering furnace for sintering at temperature of 1000° C. for 6 h to obtain a sintered magnet. After sintering, the magnet density is 7.56 $g/cm^3$.

7. Process the sintered magnet into a substrate with a size of 30×20×2 mm, and decrease and pickle the surface.

8. Sputter the substrate to form plating layer and the pressure during sputtering is 0.55 Pa. The substrate passes through the target at a speed of 10 mm/s, and the distance between the target and the substrate is kept at 95 mm. The substrate first passes through the first target material which is a Nd target material and the sputtering power is 4 kW. The first plating layer-Nd plating layer is formed on the substrate with a thickness of 1 μm. After that, the substrate passes through the second target material which is a Tb target material and the sputtering power is 20 kW. The second plating layer-Tb plating layer is formed on the surface of the first plating layer with a thickness of 4 μm. After that, the substrate passes through the third target material, which is a Dy target material and the sputtering power is 12 kW. The third plating layer-Dy plating layer is formed on the surface of the second plating layer with a thickness of 2 μm. After sputtering one side of the magnet, the magnet is turned over, and the other surface of the magnet is sputtered according to the same sputtering process to obtain a rare earth sputtering magnet.

9. Carry out grain boundary diffusion treatment on rare earth sputtering magnet to obtain rare earth diffusion magnet. The conditions of grain boundary diffusion treatment are: primary diffusion treatment: heat preservation at 920° C. for 8 h, secondary diffusion treatment: heat preservation at 500° C. for 6 h.

32 pieces of rare earth diffusion magnets are randomly sampled from the rare earth magnets in this Example for magnetic performance test. The performance test results are shown in Table 24 below.

TABLE 24

| Br(kGs) | Hcj(kOe) | Hk/Hcj | $(BH)_{max}$(MGOe) | $(BH)_{max}$ + Hcj |
|---|---|---|---|---|
| 13.18~13.24 | 32.86~33.51 | 0.94~0.96 | 43.29~43.65 | 76.25~77.11 |

The magnetic properties of 30 batches of rare earth diffusion magnets were tested and analyzed.

Set quality conditions: Br is 13.2±0.1, Hcj is 33.0±1 kOe. The calculated results are CPK of Br is 1.67 and CPK of Hcj is 1.77.

According to this Example, the solution of the present disclosure can obtain an ultra-high performance magnet. The sum of the maximum magnetic energy product $(BH)_{max}$ of the magnet and the intrinsic coercivity Hcj is greater than 75, and the magnet performance is stable, which is suitable for large scale production.

Example 9

1. Prepare the main alloy raw materials and auxiliary alloy raw materials according to the mass ratio of each element. The mass ratio of each element of the main alloy raw material is $(PrNd)_{31.3}Dy_{0.5}Tb_{0.7}Al_{0.95}Co_{1.0}Cu_{0.3}Ga_{0.8}B_{0.96}Fe_{bal}$, The mass ratio of each element of auxiliary alloy raw material is $(PrNd)_{31.3}Dy_{0.5}Tb_{0.7}Al_{0.1}Co_{1.0}Cu_{0.1}Ga_{0.8}B_{0.89}Fe_{bal}$.

Steps 2-9 are the same as in Example 8, to obtain a rare earth diffusion magnet.

32 pieces of rare earth diffusion magnets are randomly sampled from the rare earth magnets in this Example for magnetic performance test. The performance test results are shown in Table 25 below.

TABLE 25

| Br(kGs) | Hcj(kOe) | Hk/Hcj | $(BH)_{max}$(MGOe) | $(BH)_{max}$ + Hcj |
|---|---|---|---|---|
| 12.68~12.74 | 37.86~38.51 | 0.94~0.95 | 39.5~40.15 | 77.45~78.66 |

The magnetic properties of 30 batches of rare earth diffusion magnets were tested and analyzed.

Set quality conditions: Br is 12.7±0.1, Hcj is 38.0±1 kOe. The calculated results are CPK of Br is 1.65 and CPK of Hcj is 1.77.

According to this Example, the solution of the present disclosure can obtain an ultra-high performance magnet. The sum of the maximum magnetic energy product $(BH)_{max}$ of the magnet and the intrinsic coercivity Hcj is greater than 75, and the magnet performance is stable, which is suitable for large scale production.

It should be noted that the various Examples described above with reference to the accompanying drawings are only used to illustrate the present disclosure and not to limit the scope of the present disclosure. Those of ordinary skill in the art should understand that without departing from the spirit and scope of the present disclosure, modifications or equivalent replacements made to the present disclosure should all fall within the scope of the present disclosure. In addition, unless the context indicates otherwise, words appearing in the singular include the plural and vice versa. In addition, unless otherwise specified, all or part of any examples can be used in combination with all or part of any other example.

The invention claimed is:

1. A NdFeB rare earth magnet comprising:
a main phase; and
a grain boundary phase including:
a white grain boundary phase including $R^1$–T–M, wherein:
$R^1$ represents a rare earth element containing at least one of Nd or Pr, and an atomic percentage of $R^1$ in $R^1$–T–M is greater than 30 at %;
T represents a component including:
at least one of Fe or Co; and
one or more unavoidable impurity elements; and
M represents a component including at least one of Al, Cu, Nb, Zr, or Sn; and
a gray grain boundary phase including $Nd_6Fe_{13}Ga$;
wherein:
in a microstructure observation area of the rare earth magnet:
an area of the white grain boundary phase accounts for 1-3% of a total area of the microstructure observation area; and
an area of the gray grain boundary phase accounts for 2-10% of the total area of the microstructure observation area; and
a composition of the rare earth magnet by mass percentage is as follows:
a content of R is 28-32 wt % of a total magnet weight of the rare earth magnet, R representing a component including one or more rare earth elements other than Dy and Tb, and Pr and/or Nd in R being 98-100 wt % of a total weight of R;
a content of Dy and/or Tb is 0-2 wt % of the total magnet weight;
a content of M is 0.1-1.4 wt % of the total magnet weight;
a content of Ga is 0.3-0.8 wt % of the total magnet weight;
a content of B is 0.96-1.0 wt % of the total magnet weight; and
a balance amount of T.

2. The rare earth magnet according to claim 1, wherein the component represented by M includes Al and Cu, a content of Al is 0.05-1 wt % of the total magnet weight, and a content of Cu is 0.05-0.3 wt % of the total magnet weight.

3. The rare earth magnet according to claim 1, wherein:
the area of the gray grain boundary phase accounts for 2-4% of the total area of the microstructure observation area; and
a sum of a maximum energy product $(BH)_{max}$ and an intrinsic coercivity Hcj of the rare earth magnet is greater than 75, a unit of the maximum magnetic energy product (BH) max being MGOe, and a unit of the intrinsic coercivity Hcj being kOe.

4. A method for preparing the NdFeB rare earth magnet according to claim 1, comprising:
mixing a main alloy powder and an auxiliary alloy powder to obtain a mixed alloy powder, a mass percentage of the main alloy powder in the mixed alloy powder is 95-99 wt %, wherein:
the main alloy includes, by mass percentage:
28-32 wt % of Ra, Ra representing a component including one or more rare earth elements other than Dy and Tb, and a proportion of Pr and/or Nd in Ra being 98-100 wt %;
0.1-1.4 wt % of M1, M1 representing a component including at least one of Al, Cu, Nb, Zr, or Sn;
0.3-0.8 wt % of Ga;
0.97-1.0 wt % of B;
0-2 wt % of Dy and/or Tb; and
a balance amount of T1, T1 representing a component including:
at least one of Fe or Co; and
one or more unavoidable impurity elements; and
the auxiliary alloy includes, by mass percentage:
31-35 wt % of Rb, Rb representing a component including one or more rare earth elements other than Dy and Tb, and a proportion of Pr and/or Nd in Rb being 98-100 wt %;
0-1.4 wt % of M2, M2 representing a component including at least one of Al, Cu, Nb, Zr, or Sn;
0.5-0.8 wt % of Ga;
0.82-0.92 wt % of B;
0-2 wt % of Dy and/or Tb; and
a balance amount of T2, T2 representing a component including:
at least one of Fe or Co; and
one or more unavoidable impurity elements;
orienting and pressing the mixed alloy powder under a magnetic field to form a compact;
sintering the compact in a vacuum sintering furnace to obtain a sintered magnet; and
tempering the sintered magnet to obtain the rare earth magnet, including:
performing a heat preservation at a temperature of 800° C.-950° C. for 2-6h; and
performing a heat preservation at a temperature of 470° C.-520° C. for 2-8h;
wherein the rare earth magnet includes a main phase and a grain boundary phase.

5. The method according to claim 4, wherein:
the component represented by M1 includes Al and Cu;
the component represented by M2 includes Al and Cu;
a content of Al in the rare earth magnet is 0.05-1 wt % of a total magnet weight of the rare earth magnet; and
a content of Cu in the rare earth magnet is 0.05-0.3 wt % of the total magnet weight.

6. A method for preparing the NdFeB rare earth magnet according to claim 1, comprising:
mixing a main alloy powder and an auxiliary alloy powder to obtain a mixed alloy powder, a mass percentage of the main alloy powder in the mixed alloy powder is 95-99 wt %, wherein:
the main alloy includes, by mass percentage:
28-32 wt % of Ra, Ra representing a component including one or more rare earth elements other than Dy and Tb, and a proportion of Pr and/or Nd in Ra being 98-100 wt %;
0.1-1.4 wt % of M1, M1 representing a component including at least one of Al, Cu, Nb, Zr, or Sn;
0.3-0.8 wt % of Ga;
0.97-1.0 wt % of B;
0-2 wt % of Dy and/or Tb; and
a balance amount of T1, T1 representing a component including:
at least one of Fe or Co; and
one or more unavoidable impurity elements; and the auxiliary alloy includes, by mass percentage:

31-35 wt % of Rb, Rb representing a component including one or more rare earth elements other than Dy and Tb, and a proportion of Pr and/or Nd in Rb being 98-100 wt %;

0-1.4 wt % of M2, M2 representing a component including at least one of Al, Cu, Nb, Zr, or Sn;

0.5-0.8 wt % of Ga;

0.82-0.92 wt % of B;

0-2 wt % of Dy and/or Tb; and a balance amount of T2, T2 representing a component including:

at least one of Fe or Co; and one or more unavoidable impurity elements;

orienting and pressing the mixed alloy powder under a magnetic field to form a compact;

sintering the compact in a vacuum sintering furnace to obtain a sintered magnet;

machining the sintered magnet directly or the sintered magnet after being tempered to obtain a substrate;

performing sputtering on the substrate, including:

sputtering a first target material to form a first plating layer on a surface of substrate, the first plating layer including:

a Nd plating layer;

a Pr plating layer; or an alloy plating layer including two or more of Nd, Pr, and Cu; and sputtering a second target material to form a second plating layer on an outer surface of the first plating layer, the second plating layer including a Tb plating layer;

performing grain boundary diffusion treatment after the sputtering to obtain the rare earth magnet, the grain boundary diffusion treatment includes:

a heat preservation at 750° C.-1000° C. for 1h-10h; and a heat preservation at 450° C.-520° C. for 1h-10h.

7. The method according to claim 6, wherein a thickness of the first plating layer is 1-2 μm, a thickness of the second plating layer is 2-12 μm, and the surface of the substrate is perpendicular to an orientation direction of the substrate.

8. The method according to claim 6, wherein:

performing the sputtering on the substrate further includes sputtering a third target material to form a third plating layer on a surface of the second plating layer, the third plating layer including a Dy plating layer; and the thickness of the first plating layer is 1-2 μm, the thickness of the second plating layer is 2-10 μm, and a thickness of the third plating layer is 1-2 μm.

9. The method according to claim 6, wherein:

the component represented by M1 includes Al and Cu;

the component represented by M2 includes Al and Cu;

a content of Al in the rare earth magnet is 0.05-1 wt % of a total magnet weight of the rare earth magnet; and a content of Cu in the rare earth magnet is 0.05-0.3 wt % of the total magnet weight.

* * * * *